US006892167B2

(12) United States Patent
Polan et al.

(10) Patent No.: US 6,892,167 B2
(45) Date of Patent: May 10, 2005

(54) REAL-TIME DATA ACQUISITION AND STORAGE NETWORK

(75) Inventors: Jeffrey S. Polan, New Hope, PA (US); William A. Bullers, Pasadena, CA (US)

(73) Assignee: Sypris Data Systems, Inc., San Dimas, CA (US)

( * ) Notice: Subject to any disclaimer, the term of this patent is extended or adjusted under 35 U.S.C. 154(b) by 72 days.

(21) Appl. No.: 10/304,900

(22) Filed: Nov. 26, 2002

(65) Prior Publication Data

US 2003/0172123 A1 Sep. 11, 2003

Related U.S. Application Data

(60) Provisional application No. 60/334,011, filed on Nov. 28, 2001.

(51) Int. Cl.[7] ............................................... G06F 11/00
(52) U.S. Cl. ....................... 702/187; 702/187; 702/176; 702/89; 702/80; 710/20; 710/25; 700/88; 700/94; 700/90; 709/213; 709/230
(58) Field of Search ........................... 702/80, 89, 176, 702/177, 182, 187–189; 710/20, 25; 700/88, 94, 90; 709/213, 230; 707/101, 103 R; 382/278

(56) References Cited

U.S. PATENT DOCUMENTS

| 4,682,292 A | 7/1987 | Bue et al. ..................... 364/424 |
| 5,214,768 A | 5/1993 | Martin et al. ................ 395/425 |
| 5,471,631 A | 11/1995 | Beardsley et al. ........... 395/650 |
| 5,583,995 A | 12/1996 | Gardner et al. ........ 395/200.09 |
| 5,640,194 A | 6/1997 | Suzuki et al. ................... 348/7 |
| 5,651,132 A | 7/1997 | Honda et al. ................ 395/441 |
| 5,678,023 A | 10/1997 | Adams et al. ............... 395/439 |
| 5,680,864 A | 10/1997 | Morgan et al. ............. 128/696 |
| 5,713,023 A | 1/1998 | Hayata et al. .............. 395/616 |
| 5,729,763 A | 3/1998 | Leshem ....................... 395/858 |
| 5,732,239 A | 3/1998 | Tobagi et al. ................ 395/441 |
| 5,752,256 A | 5/1998 | Fujii et al. ................... 711/114 |
| 5,768,623 A | 6/1998 | Judd et al. ................... 395/857 |

(Continued)

FOREIGN PATENT DOCUMENTS

| EP | 0 629 968 | 12/1994 | ........... G06F/15/74 |
| EP | 0 774 724 | 5/1997 | ........... G06F/17/40 |

OTHER PUBLICATIONS

Mann et al., 'Implementation of Embedded Streaming for Large Video Applications Using Object–Relational Database and PHP', Jan. 2000, IEEE, pp. 201–204.*

(Continued)

Primary Examiner—Marc S. Hoff
Assistant Examiner—Elias Desta
(74) Attorney, Agent, or Firm—Wood, Herron & Evans, LLP

(57) ABSTRACT

A real-time data acquisition and storage network for real-time acquisition and storage of analog and digital data from one or multiple network-connected data sources to one or multiple network-connected storage devices during a data recording session, and precise reconstruction of the acquired data from one or multiple of the network-connected storage devices during a playback session. The data source are connected to the network through one or multiple real-time data acquisition network ("R-T DAN") modules which form one or multiple network-connected data acquisition nodes on the network. Each storage device forms a network-connected storage node on the network so that data acquired at any data acquisition node may be applied to the network and stored at any storage node during a data recording session. The stored data may be retrieved from the storage nodes through the network and routed to the data acquisition nodes for reconstruction of the data during a playback session.

30 Claims, 14 Drawing Sheets

U.S. PATENT DOCUMENTS

| | | | |
|---|---|---|---|
| 5,895,483 | A | 4/1999 | Mori .......................... 711/114 |
| 5,907,820 | A | 5/1999 | Pan ............................ 702/155 |
| 5,926,649 | A | 7/1999 | Ma et al. .................... 395/826 |
| 5,974,503 | A | 10/1999 | Venkatesh et al. .......... 711/114 |
| 6,000,020 | A | 12/1999 | Chin et al. .................. 711/162 |
| 6,076,142 | A | 6/2000 | Corrington et al. ......... 711/114 |
| 6,122,639 | A * | 9/2000 | Babu et al. ............. 707/103 R |
| 6,182,123 | B1 * | 1/2001 | Filepp et al. ............... 709/217 |
| 6,219,753 | B1 | 4/2001 | Richardson ................ 711/114 |
| 6,374,260 | B1 * | 4/2002 | Hoffert et al. ........... 707/104.1 |
| 6,438,575 | B1 * | 8/2002 | Khan et al. ................. 709/200 |
| 6,697,814 | B1 * | 2/2004 | Porter ........................ 707/102 |
| 2002/0019881 | A1 * | 2/2002 | Bokhari et al. ............. 709/246 |
| 2002/0024973 | A1 * | 2/2002 | Tavana et al. .............. 370/508 |
| 2002/0038257 | A1 * | 3/2002 | Joseph et al. ................. 705/26 |

OTHER PUBLICATIONS

Dan et al., 'Buffering and Caching in Large–Scale Video Servers', Jan. 1995, IEEE, pp. 201–204.*

Metrum–Datatape Inc., *Instrumentation Product Catalog*, 2000 (16 pages).

* cited by examiner

REAL-TIME DATA ACQUISITION AND STORAGE NETWORK

The present application claims the filing benefit of U.S. Provisional Application Ser. No. 60/334,011, filed Nov. 28, 2001, the disclosure of which is hereby incorporated herein by reference in its entirety.

FIELD OF THE INVENTION

The present invention relates generally to data acquisition systems for acquiring data from data sources and, more particularly, to a data acquisition and storage system for acquiring and storing data from one or more data sources during a data recording session and reconstructing the acquired data during a playback session.

BACKGROUND OF THE INVENTION

Data acquisition and storage systems have been developed in the past for acquiring data from a data source and storing the acquired data on a storage device such as a RAID or tape drive recording system. For example, in flight/test, intelligence and other data-critical applications, time division multiplexers (TDM's) have been developed and used for high-speed real-time data collection and storage wherein data from multiple data input channels is fed as a single output stream into a suitable tape or disc recorder. These known time division multiplexers have typically utilized a buffer-based, rigidly pre-programmed time-division multiplexed data bus with a single output port feeding the output stream to the tape or disc recorder. While these systems provide for flexible selection of and configuration of plug-in input interfaces, time-tagging and channel ID, acceptable channel latencies, and aggregate data rates as high as 30–60 Mbytes/s, they suffer from a drawback in that they require precise knowledge of all input data characteristics, including individual data rates and signaling formats, to precisely pre-program the multiplexer's "time-slicing" operation and select the appropriate interface modules. Once programmed, input channel characteristics were fixed and could not deviate from expected values without significant data loss.

Moreover, prior approaches, based on time division multiplexers (TDM's), feeding a single output stream into a suitable tape or disc recorder, cannot scale to the massive aggregate data rates now being contemplated in data-critical applications which require aggregate data rates of up to 1 Gbs or more. While existing Storage Area Networks (SAN's) offer high-speed file-based storage that can scale flexibly over both aggregate data rates and capacities, known SAN's do not address the special data and timing control requirements present in data acquisition and storage systems for both storage and accurate playback of data.

Therefore, there is a need for a data acquisition and storage network which is capable of supporting high speed aggregate data rates of the most demanding of data-critical applications. There is also a need for a data acquisition and storage network which is easily configurable for a wide variety of data acquisition requirements.

SUMMARY OF THE INVENTION

The present invention overcomes the foregoing and other shortcomings and drawbacks of the data acquisition systems and methods heretofore known. While the invention will be described in connection with certain embodiments, it will be understood that the invention is not limited to these embodiments. On the contrary, the invention includes all alternatives, modifications and equivalents as may be included within the spirit and scope of the present invention.

In accordance with the principles of the present invention, a real-time data acquisition and storage network is provided for real-time acquisition and storage of analog and digital data from one or multiple network-connected data sources to one or multiple network-connected storage devices during a data recording session, and precise reconstruction of the acquired data from one or multiple of the network-connected storage devices during a playback session.

Each data source is connected to the network through one or more real-time data acquisition network ("R-T DAN") modules which provide numerous data acquisition specific functions, including high-resolution deterministic time tagging of the input data from Input/Output ("I/O") User Interface cards, recording precision clock measurement on input and retrieving clock-generation data on playback, inputs for auxiliary IRIG time code and voice track, and synchronization of multiple inputs/outputs individually and across multiple R-T DAN modules. One or more storage devices, such as RAIDS, optical discs, tape recorders, solid state memory or any other conventional storage media, are connected to the real-time data acquisition and storage network for storing the data acquired from the data sources through the R-T DAN modules.

In accordance with the principles of the present invention, each R-T DAN modules forms one or multiple network-connected data acquisition nodes and each storage device forms a network-connected storage node so that data acquired at any data acquisition node may be applied to the network and stored at any storage node during a data recording session. The stored data may be retrieved from the storage nodes through the network and routed to the data acquisition nodes for reconstruction of the data during a playback session.

Each R-T DAN module may include an optional internal single board Operation, Administration and Maintenance (OAM) controller which is connected to the real-time data acquisition and storage network. The internal OAM controller is operable to configure, provision, monitor and control the R-T DAN modules for a particular data recording or playback session. Alternatively, the R-T DAN module is capable of being configured remotely through the real-time data acquisition and storage network by one or multiple OAM workstations.

The real-time data acquisition and storage network may comprise a fibre channel (FC) point-to-point network, a fibre channel (FC) arbitrated loop network or a fibre channel (FC) switched fabric network. The real-time data acquisition and storage network may comprise SCSI-3 over Fibre Channel Arbitrated Loop for serverless, file-based multiplexing/demultiplexing or, alternatively, ATM over Fibre Channel (AA5) for full ATM cell-based space-time division multiplexing.

The real-time data acquisition and storage network of the present invention is adapted to provide precise real-time data multiplexing of synchronous signals and data using separate files for each data channel stored on a storage device, i.e., file-based real-time multiplexing by space-time division multiplexing. The real-time data acquisition and storage network of the present invention is further adapted to provide precise real-time data multiplexing of synchronous signals and data using cell-based data packets stored and retrieved across one or multiple networks with transparently connected storage, i.e., network-based real-time multiplexing by space-time division multiplexing. The real-time data acquisition network of the present invention is capable of scaling over a wide range of individual and aggregate data bandwidths, number of data input channels, and total storage capacity, while preserving precise reconstruction, accurate channel-to-channel time coherency, and ease of configuration, monitoring and control.

BRIEF DESCRIPTION OF DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE PREFERRED EMBODIMENT

Figure 1:
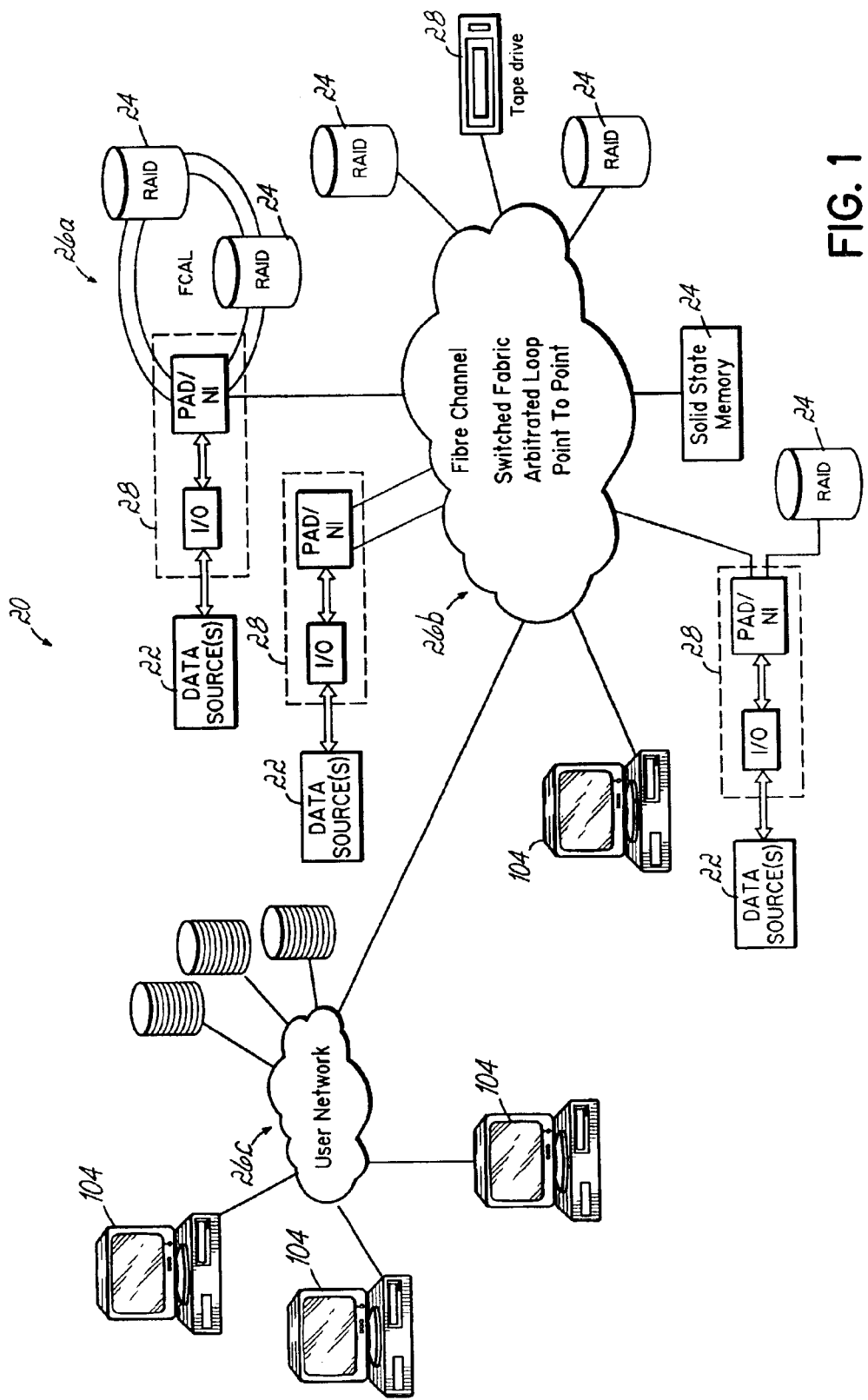
FIG. 1 is a schematic block diagram of a real-time data acquisition and storage network in accordance with the principles of the present invention, illustrating multiple real-time data acquisition network ("R-T DAN") modules and storage devices connected to a wide area network.

Referring now to the Figures, and to FIG. 1 in particular, a real-time data acquisition and storage network 20 is shown in accordance with the principles of the present invention. As will be described in detail below, the real-time data acquisition and storage network 20 supports many different configurations for flexible real-time acquisition and storage of analog and digital data from one or multiple network-connected data sources 22 to one or multiple network-connected storage devices 24 during a data recording session, and precise reconstruction of the acquired data from one or multiple of the network-connected storage devices 24 during a playback session. The data sources 22 do not form part of the present invention per se and may comprise any data source typically found in conventional data acquisition environments, such as those typically found in launch support, flight/weapons test, instrumentation, range telemetry, ASW, ground station, intelligence, telecom signal capture, satellite links and telemetry, image acquisition and storage, C4ISR, radar, sonar or any other data acquisition environment well known to those of ordinary skill in the art.

The real-time data acquisition and storage network 20 of the present invention is adapted to provide precise real-time data multiplexing of synchronous signals and data using separate files for each data channel stored on a storage device 24, i.e., file-based real-time multiplexing by space-time division multiplexing. The real-time data acquisition and storage network 20 of the present invention is further adapted to provide precise real-time data multiplexing of synchronous signals and data using cell-based data packets stored and retrieved across one or multiple networks with transparently connected storage, i.e., network-based real-time multiplexing by space-time division multiplexing. In this way, the real-time data acquisition network 20 of the present invention is capable of scaling over a wide range of individual and aggregate data bandwidths, number of data input channels, and total storage capacity, while preserving precise reconstruction, accurate channel-to-channel time coherency, and ease of configuration, monitoring and control.

As used herein, "real-time data acquisition and storage" refers to an environment wherein a set of continuous signal streams presented by multiple data channels are acquired and stored with essentially no interruption of the signal or loss of the signal and its data. The signals from all of the selected data channels are played back with essentially no interruption of the signal or loss of the signal and its data and with the precise time relationship between the channels that existed during the acquisition.

"Real-time data multiplexing" as used herein refers to an environment wherein continuous signal streams presented by multiple data channels are acquired and combined into a single, ordered or grouped set that can be retrieved, transferred, copied, deleted, and processed using a single operation. The combining of these signals maintains the precise time relationship between them as they are processed so that essentially no time displacement, loss, distortion or change of any signal or its data occurs. The precise time relationship of the separate channels is not deteriorated as they are processed.

"Space-time division multiplexing" as used herein refers to an environment wherein continuous signal streams presented by multiple data channels are acquired and combined into a single, ordered or grouped set with sub-elements of the set separated from each other and sent to different unrelated locations. The entire set and all of its sub-elements can be retrieved, transferred, copied, deleted, and processed using a single operation. The combining of these signals maintains the precise time relationship between them as they are separated to different locations and processed so that essentially no time displacement, loss, distortion or change of any signal or its data occurs. The precise time relationship of the separate channels is not deteriorated as they are processed.

Further referring to FIG. 1, the real-time data acquisition and storage network 20 may comprise a fibre channel (FC) point-to-point network, a fibre channel (FC) arbitrated loop network or a fibre channel (FC) switched fabric network by way of example. The fibre channel network may be configured as a single network or as multiple networks 26a, 26b and 26c as shown in FIG. 1. The real-time data acquisition and storage network 20 may comprise SCSI-3 over Fibre Channel Arbitrated Loop for serverless, file-based multiplexing/de-multiplexing or, alternatively, ATM over Fiber Channel (AA5) for full ATM cell-based space-time division multiplexing as described in detail below, although other alternative network architectures are possible as well without departing from the spirit and scope of the present invention.

In accordance with the principles of the present invention, each data source 22 is connected to the network 20 through one or more real-time data acquisition network ("R-T DAN") modules 28 which provide numerous data acquisition specific functions, including high-resolution deterministic time tagging of the input data from Input/Output ("I/O") User Interface cards 30 (see FIG. 2), recording precision clock measurement on input and retrieving clock-generation data on playback, inputs for auxiliary IRIG time code and voice track, and synchronization of multiple inputs/outputs individually and across multiple R-T DAN modules 28. One or more storage devices 24, such as RAIDS, optical disks, tape recorders, solid state memory or any other conventional storage media, are connected to the real-time data acquisition and storage network 20 for storing the data acquired from the data sources 22 through the R-T DAN modules 28.

In accordance with the principles of the present invention, each R-T DAN module 28 forms one or more network-connected data acquisition nodes and each storage device 24 forms a network-connected storage node so that data acquired at any data acquisition node (i.e., R-T DAN module 28) may be applied to the network 20 and stored at any storage node (i.e., storage device 24) during a data recording session. The stored data may be retrieved from the storage nodes (i.e., storage devices 24) through the network 20 and routed to the data acquisition nodes (i.e., R-T DAN modules 28) for reconstruction of the data during a playback session in one embodiment of the present invention as will be described in detail below.

Real-Time Data Acquisition Network ("R-T DAN") Modules

Figure 2:
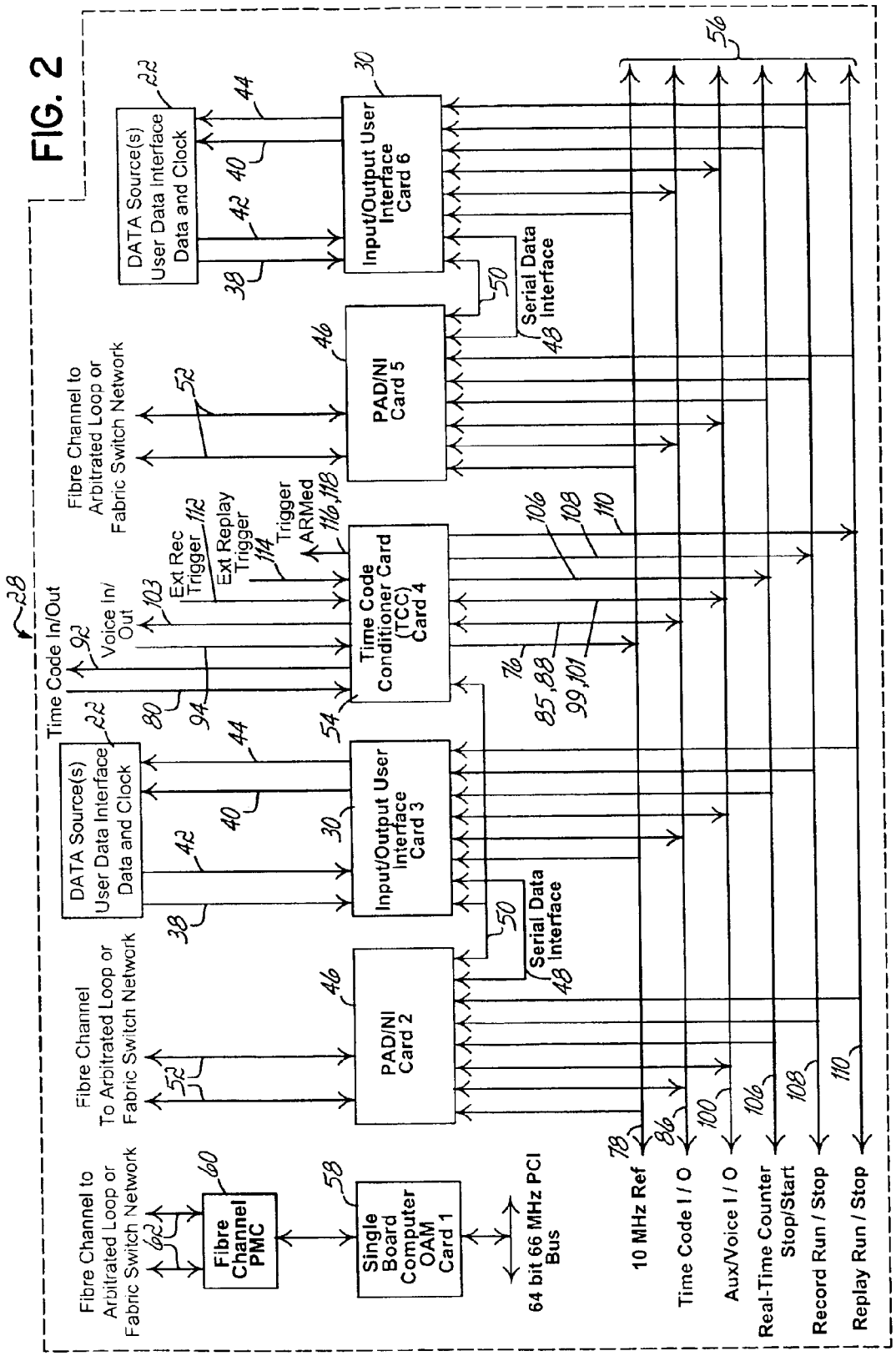
FIG. 2 is a schematic block diagram of an exemplary R-T DAN module in accordance with the principles of the present invention.
Figure 15:
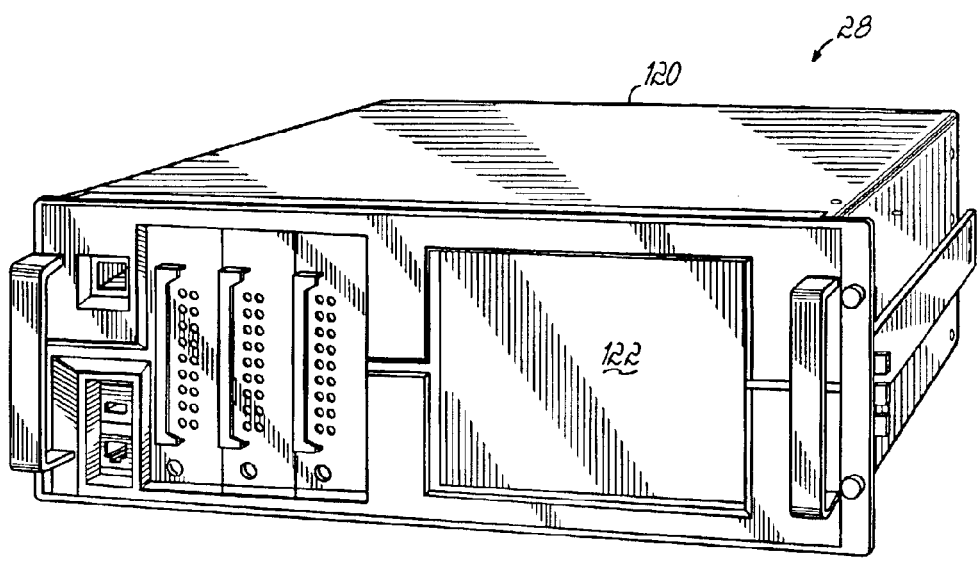
FIG. 15 is a perspective view of an exemplary R-T DAN module in accordance with the principles of the present invention.

Referring now to FIGS. 2 and 15, an exemplary real-time data acquisition network ("R-T DAN") module 28 is shown in accordance with the principles of the present invention for interfacing one or more of the data sources 22 to the real-time data acquisition and storage network 20. As shown in FIG. 2, each R-T DAN module 28 includes one or multiple Input/Output ("I/O") User Interface cards 30 (two shown in FIG. 2) which are selected by type depending on the format of the data generated by the data sources 22 connected to the R-T DAN module 28. For example, each of the I/O User Interface cards 30 may comprise an Analog Interface Input/Output ("I/O") card 32 (see FIG. 5), a Digital Serial Interface Input/Output ("I/O") card 34 (see FIG. 6) or a Digital Parallel Interface Input/Output ("I/O") card 36 (see FIG. 7) which can be mixed and matched within a single R-T DAN module 28 depending on the particular data acquisition requirement.

As will be described in detail below, each I/O User Interface card 30 includes one or multiple data input channels 38 which are connected to one or multiple data sources 22 for receiving either digital or analog data from the data sources 22 during a data recording session depending on the I/O card type. Each I/O User Interface card 30 further includes one or more data output channels 40 which are connected to one or more of the data sources 22 for applying either digital or analog data to the data sources during a playback session depending on the I/O card type. Clock inputs 42 and clock outputs 44 are also provided on each I/O User Interface card 30 as will be described in detail below.

In addition to the various I/O User Interface cards 30, each R-T DAN module 28 includes one or more Packetizer-Depacketizer Network Interface ("PAD/NI") cards 46 (see FIGS. 2 and 4) which are each connected to a respective one of the I/O User Interface cards 30 in one embodiment of the present invention through a Low Voltage Differential Signal ("LVDS") serial data interface 48 and an RS-485 interface 50 as will be described in detail below. In one embodiment of the present invention, each PAD/NI card 46 includes a pair of 2 Gbps bidirectional fibre channel (FC) links 52 for applying data acquired from its respective I/O User Interface card 30 to the real-time data acquisition and storage network 20 during a data recording session and for applying data retrieved through the network 20 from the storage devices 24 to its respective I/O User Interface card 30 during a playback session.

Each R-T DAN module 28 further includes a Time Code Conditioner ("TCC") card 54 (see FIGS. 2 and 3) which is connected to each I/O User Interface card 30 and each PAD/NI card 46 within the R-T DAN module 28 through a shared internal bus 56 (see FIG. 2). As will be described in greater detail below, the TCC card 54 applies timing and control signals through the shared internal bus 56 to each of the I/O User Interface cards 30 and PAD/NI cards 46 to synchronize and control the I/O User Interface cards 30 and PAD/NI cards 46 within the R-T DAN module 28 during data recording and playback sessions.

Further referring to FIG. 2, each R-T DAN module 28 may include an optional internal single board Operation, Administration and Maintenance (OAM) controller 58 which is connected to the real-time data acquisition and storage network 20 through a fibre channel PMC interface 60 and a pair of bidirectional fibre channel (FC) links 62. The OAM controller 58 communicates with each of the PAD/NI cards 46 through the real-time data acquisition and storage network 20. The OAM controller 58 communicates with the TCC card 54 through the network 20 to a selected one of the PAD/NI cards 46 (i.e., PAD/NI Card 2 in FIG. 2), and from that selected one PAD/NI card 46 through the RS-485 interface 50 which connects the selected one PAD/

NI card 46 to the TCC card 54. The optional internal OAM controller 58 is operable to configure, provision, monitor and control the R-T DAN module 28 for a particular data recording or playback session. The architecture and operation of the components of the R-T DAN module 28, including the TCC card 54, the PAD/NI cards 46, and the I/O User Interface cards 30 are described in detail below.

Time Code Conditioner ("TCC") Card

Figure 3:
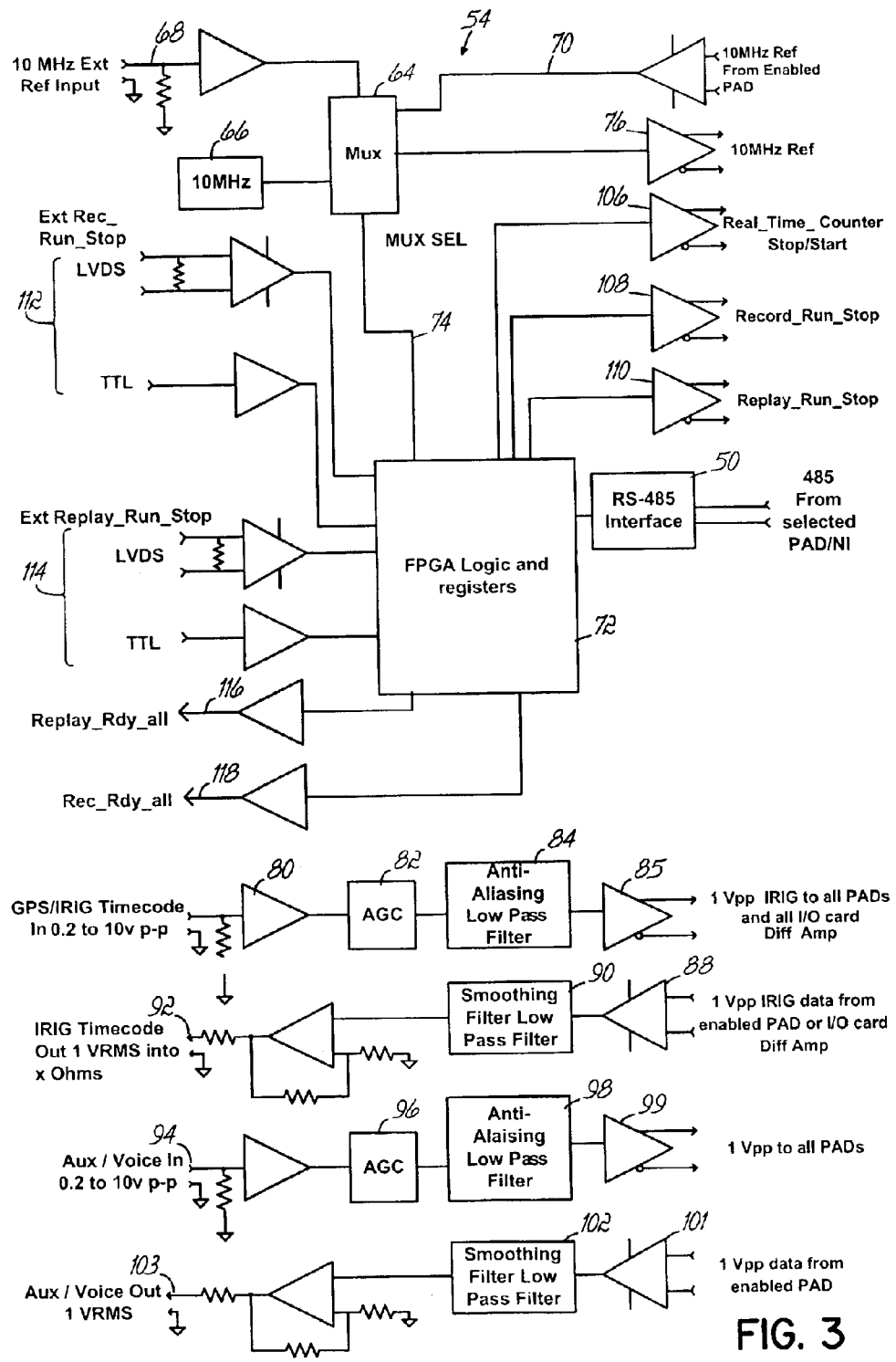
FIG. 3 is a schematic block diagram of an exemplary Time Code Conditioner ("TCC") card in accordance with the principles of the present invention.

Referring now to FIG. 3, the architecture of the TCC card 54 is shown in detail. The TCC card 54 includes a multiplexer 64 which is capable of receiving a 10 MHz clock signal from three (3) independent clock sources. These clock sources include an on board 10 MHz clock 66, a 10 MHz External Clock Reference 68 or, alternatively, a 10 MHz clock signal 70 generated by an enabled PAD/NI card 46. The 10 MHz clock signal source is selected by the OAM controller 58 from these three (3) independent clock sources through the RS-485 interface 50 to an FPGA logic controller 72 which controls the multiplexer 64 through a multiplexer select control line 74. The 10 MHz clock signal output 76 of the multiplexer 64 of the TCC card 54 is applied to each PAD/NI 46 and I/O User Interface card 30 through the 10 MHz Clock Reference line 78 of the shared internal bus 56 of the R-T DAN module 28. The 10 MHz clock signal 76 applied from the TCC card 54 to each of the I/O User Interface cards 30 and PAD/NI cards 40 on 10 MHz Clock Reference line 78 is used to synchronize the I/O User Interface cards 30 and PAD/NI cards 46 within an R-T DAN module 28 during data recording and playback sessions so that the PAD/NI cards 46 and I/O User Interface cards 30 are synchronized within 1 clock cycle.

The TCC card 54 includes an IRIG/GPS Timecode input 80 for receiving IRIG precision timecodes generated from either an IRIG or GPS precision timecode source (not shown) connected to the TCC card 54. The IRIG precision timecodes are applied to an automatic gain control (AGC) 82 and an anti-aliasing low pass filter 84 before being applied to all of the PAD/NI cards 46 and I/O User Interface cards 30 through an IRIG output 85 to the Time Code Input/Output signal line 86 of the shared internal bus 56 of the R-T DAN module 28. During playback, the TCC card 54 is also configured to receive IRIG precision timecodes at an IRIG input 88 from an enabled PAD/NI card 46 or I/O User Interface card 30 through the Time Code Input/Output signal line 86 of the shared internal bus 56 of the R-T DAN module 28. The IRIG precision timecodes from an enabled PAD/NI card 46 or I/O User Interface card 30 are applied to a smoothing filter/low pass filter 90 before being applied to an IRIG Timecode output 92 of the TCC card 54.

The TCC card 54 also includes an Auxiliary/Voice In 94 which is applied to an automatic gain control (AGC) 96 and an anti-aliasing low pass filter 98 before being applied to all of the PAD/NI cards 46 through the AUX/Voice Output 99 and to the AUX/Voice Input/Output signal line 100 of the shared internal bus 56 of the R-T DAN module 28. The TCC card 54 is also configured to receive auxiliary/voice data during playback at an Auxiliary/Voice input 101 from an enabled PAD/NI card 46 through the AUX/Voice Input/Output signal line 100 of the shared internal bus 56 of the R-T DAN module 28. The AUX/Voice data is applied to a smoothing/low pass filter 101 and then to an AUX/Voice Output 103.

Configuration, provisioning monitoring and control signals from the optional internal OAM controller 58 are applied to the FPGA controller 72 from a selected PAD/NI 46 through the RS-485 interface 50 which connects the selected PAD/NI 46 to the TCC card 54. Alternatively, if the optional OAM controller 58 is not present in the R-T DAN module 28, the R-T DAN module 28 is capable of being configured remotely through the real-time data acquisition and storage network 20 from one or multiple remote OAM workstations 104 as shown in FIG. 1.

The TCC card 54 also provides control signals, including a "Real-Time Counter Stop/Start" signal 106, a "Record Run/Stop" signal 108, and a "Replay Run/Stop" signal 110 to each of the PAD/NI cards 46 and I/O User Interface cards 30 through the shared internal bus 56 of the R-T DAN module 28 as shown in FIG. 2. The "Real-Time Counter Stop/Start" signal 106, "Record Run/Stop" signal 108, and "Replay Run/Stop" signal 110 are set-up by the OAM controller 58 through the RS-485 interface 50 that connects the selected PAD/NI card 46 to the TCC card 54. External triggers, including an "External Record Run/Stop" signal 112 and an "External Replay Run/Stop" signal 114 are connected to the FPGA controller 72 of the TCC card 54 to provide for external triggering of record and replay events. A "Replay Ready" control signal output 116 and a "Record Ready" control signal 118 are provided by the TCC card 54 to indicate that the R-T DAN module 28 is ready and armed for an external triggering event.

Referring to FIG. 15, an exemplary R-T DAN module 28 is shown in detail. The R-T DAN module 28 includes a rack-mount housing 120 which encloses the TCC card 54, the PAD/NI cards 46, the I/O User Interface cards 30 and the internal OAM controller card 58 which are connected in the exemplary embodiment of the R-T DAN module 28 as shown in FIG. 2. The R-T DAN module 28 includes an LCD touch screen 122 to provide for user inputs to the R-T DAN module 28, such as the "Record Run/Stop" signal 108 and "Replay Run/Stop" signal 110 to control record or playback sessions. The LCD touch screen 122 also provides information to the user regarding the status of the R-T DAN module 28.

Packetizer-Depacketizer Network Interface ("PAD/NI") Card

The PAD/NI card 46 can be selected to record raw data received at the inputs 38 of I/O User Interface card 30. Alternatively the PAD/NI card 46 can be selected to preprocess data before recording to either trigger the raw data recording or to directly record the resultants of the preprocessing. Examples of preprocessing manipulation include data compression, transformations of the data such as FFT, detection of significant data events and characteristics, and a multitude of other processing possibilities. In one embodiment of the PAD/NI card 46, raw or processed data can be selected for recording. The PAD/NI card 46 can be selected to playback raw recorded data stored on storage devices 24. Alternatively, the PAD/NI card 46 can be selected to postprocess the playback data before presenting it to the I/O User Interface card 30. Examples of post processing include data decompression, and the selective playback of detected events and characteristics.

Figure 4:
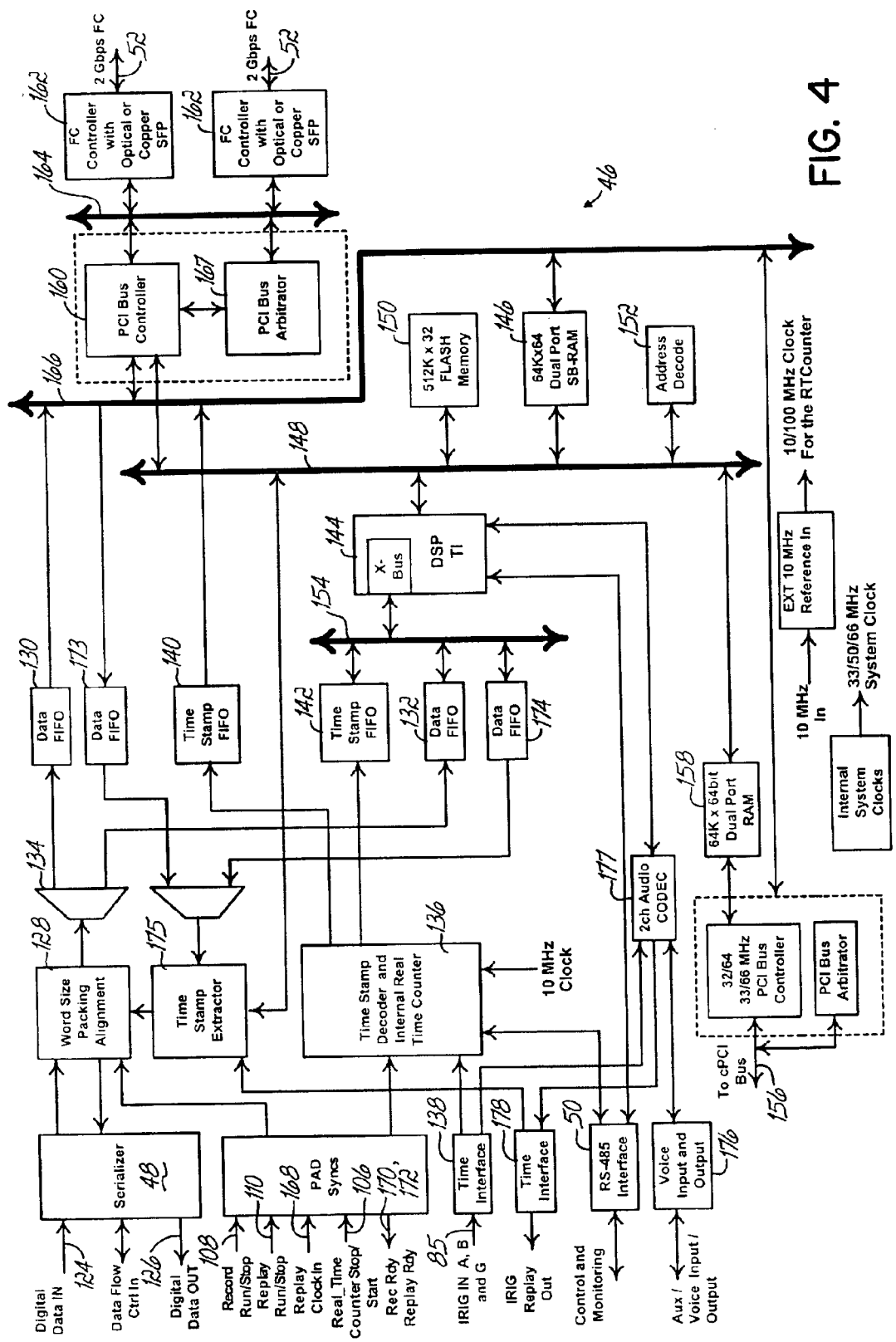
FIG. 4 is a schematic block diagram of an exemplary Packetizer-Depacketizer Network Interface ("PAD/NI") card in accordance with the principles of the present invention.

Referring now to FIG. 4, the architecture of an exemplary PAD/NI card 46 is shown in detail. Each PAD/NI card 46 is interfaced for record and playback of data to and from an I/O User Interface card 30 through the Low Voltage Differential Signal (LVDS) Serializer data interface 48, such as a National Semiconductor 4838 serializer interface. Each digital data input 124 of the serializer data interface 48 comprises nine (9) differential pairs and a clock input which are generated by an I/O User Interface card 30 which may comprise the Analog Interface Input/Output ("I/O") card 32 (see FIG. 5), the Digital Serial Interface Input/Output ("I/O") 34 card (see FIG. 6) or the Digital Parallel Interface Input/Output ("I/O") 36 card (see FIG. 7) which are described in detail below. Each digital data output 126 of the serializer data interface 48 also comprises nine (9) differential pairs and a clock input which are generated by the PAD/NI card 46 and applied to the connected I/O User Interface card 30 during a playback session. In one embodiment of the present invention, the LVDS serializer interface 48 of the PAD/NI 46 is capable of supporting a sustained user data rate of up to about 400 Mbytes/s, although other sustained data rates are possible as well without departing from the spirit and scope of the present invention.

In one embodiment, the serializer 48 receives and converts the incoming data from the I/O User Interface card 30 to a 32-bit parallel format that is applied to a Word Size Packing Alignment circuit 128. The alignment performed at the Word Size Packing Alignment circuit 128 is selectable by the user so that the incoming data from the I/O User Interface card 30 is formatted into 64 bit wide words and stored into data FIFO's 130 and 132 through a multiplexer 134. Data stored in data FIFO 130 is available for raw data recording where every data byte is recorded just as it is received from the word size packing alignment circuit 128. Data stored in data FIFO 132 is available for preprocessing and modification before being recorded. Simultaneously with the storage of the data into the data FIFO's 130 and 132, the precision IRIG timecode signal 85 from the TCC card 54 is applied to a Time Stamp Decoder and Internal Real Time Counter circuit 136 through an IRIG Time Interface circuit 138. The Time Stamp Decoder and Internal Real Time Counter circuit 136 also receives the 10 MHz clock input signal from the TCC card 54. From the IRIG timecode signal 85 generated by the TCC card 54, a time stamp (or time tag) is derived by the Time Stamp Decoder 136. The time stamp granularity is correlated to 10 nanoseconds using a high resolution 100 MHz internal clock locked to the 10 MHz reference clock. The decoded time stamp is then applied to time stamp FIFO's 140 and 142. Each data word of the time stamp data stored in time stamp FIFO's 140 and 142 represents the time at which each increment of data stored in data FIFO's 130 and 132 was recorded at the digital data input 124 of the LVDS serial data interface 48. These time stamps are embedded into the data and recorded as a time record of when every raw or processed data segment was received by the PAD/NI card 46. The embedding of time stamps into the data is described in detail below. The time stamp that is applied to time stamp FIFO's 140 and 142 by the Time Stamp Decoder and Internal Real Time Counter 136 is a complete date time group (DTG) identifying the year, month, day, hour, minute, second, tenth-second, hundredth-second, thousandth-second, and ten-thousandth-second. This complete DTG is embedded into the data and recorded as a time record of when every raw or processed data segment was received by the PAD/NI card 46. The OAM controller 58 initializes the Real Time Counter 136 with Year, Month, Day and Time information.

The PAD/NI card 46 is configured for storage of the data on one or more storage devices 24 through the 2 Gbps fibre channel (FC) links 52. Data handling control and preprocessing or processing manipulation and analysis of the data is performed by a DSP 144, such as a TMS320C6204GLW DSP commercially available from Texas Instruments Corporation. Other DSPs from the same supplier or other suppliers are possible as well. The DSP 144 stores information and/or resultants of data processing to be recorded in a 64K×64 dual port RAM 146 connected to the DSP controller 144 through a 32 bit, 100 MHz EMIF bus 148. A 512K×32 FLASH memory 150 and address decode circuit 152 are connected to the DSP 144 through the 32 bit, 100 MHz EMIF bus 148. The FLASH memory 150 and address decode circuit 152 contain software programs and control information used by the DSP 144 to perform its selected functions. The DSP 144 is connected to the data FIFO 132 and the time stamp FIFO 142 through the 32 bit, 100 MHz X-Bus 154 supported by the DSP. The DSP 144 controls overall operation of the PAD/NI 46 using the EMIF Bus 148 and is configured by the internal OAM controller 58 or remotely from an OAM workstation 104 (see FIG. 1) through the network 20. The DSP 144 provides the control of data formatting, packetization/depacketization and, coordination and monitoring of all functions of the PAD/NI card 46. The DSP 144 also performs the selected preprocessing and post processing manipulation of the data.

Two (2) compact PCI (cPCI) slots 156 (only one cPCI is shown) are provided in one embodiment on the PAD/NI card 46. The cPCI slots 156 accommodate lower-speed IO devices and peripherals, such as TDM multiplexers (not shown) or multi-channel converters (not shown). Data from low speed IO devices and peripherals is stored in a 64K×64 bit dual port RAM 158 which is connected to the DSP 144 through the 32 bit, 100 MHz EMIF bus 148. In one embodiment, each cPCI slot 156 is capable of maximum burst transfers at about 133 Mbytes/s, sustained data rates of about 80–100 Mbytes/s when a single slot 156 is used, and about 80 Mbytes/s aggregate rates when both slots 156 are used. Data can be simultaneously acquired from both the LVDS serializer interface 48 and the cPCI slots 156. In applications where data is made available simultaneously for recording from the LVDS serializer 48 and from the cPCI 156, the DSP 144 programs a PCI Bus Controller 160 to first draw an interval of data from data FIFO 130 and write it to a storage device 24, and then draw an interval of data from the dual port RAM 158 and write it to a storage device 24. Time stamps taken from the time stamp FIFO 140 are embedded into the data from each source data FIFO 130 and dual port RAM 158. The embedded data format is described in FIG. 14. The DSP 144 continues to issue write commands alternating the source of the data from data FIFO 130 and dual port RAM 158 throughout a complete recording cycle.

The PAD/NI card 46 includes dual fibre channel (FC) controllers 162 which are connected to the PCI Bus Controller 160 through a 64 bit, 66 MHz internal PCI bus 164. Each of the fibre channel controllers 162 may comprise an ISP 2310 Fiber Channel Controller commercially available from Qlogic Corporation, although other fibre channel controllers are possible as well. The PCI Bus Controller 160 may comprise a Quick Logic Programmable Gate Array QL5064 with built-in PCI Bus Controller commercially available from QuickLogic Corporation, although other Programmable Gate Arrays with built-in PCI Bus Controllers are possible as well.

In one embodiment of the PAD/NI cards 46, each of the Fibre Channel Controllers 162 connects in separate 2 Gbits/s FC-2 networks and delivers/receives data across the network at 200 Mbytes/s. The PCI Bus Controller 160 can be programmed in one application of the PAD/NI card 46 to simultaneously use both Fibre Channel Controllers 162 and alternately request transfers at 400 Mbytes/s to/from the data FIFO 130, each Fibre Channel Controller 162 delivering or receiving 200 Mbytes/s across its separate network and achieving 400 Mbytes/s aggregate write or read speed. The Fibre Channel Controllers 162 are assigned unique addresses on the network 20 that they are part of so that each PAD/NI card 46 has a unique network address associated therewith. Data FIFO 130 and the time stamp FIFO 140 are connected through a 64 bit, 100 MHz data bus 166 to the PCI Bus Controller 160 and PCI Bus Arbitrator Logic 167. The Fibre Channel Controllers 162 are connected to the DSP 144 through the 64 bit, 100 MHz data bus 166. The 64K×64 dual port RAM 146 is used to exchange DSP data between the 32 bit, 100 MHz EMIF bus 148 and the 64 bit, 100 MHz data bus 166.

The PAD/NI 46 includes multiple synchronization inputs, including the "Record Run/Stop" signal 108 and the "Replay Run/Stop" signal 110 that connect with the TCC card 54, and a "Replay Clock In" signal 168 from the User Interface I/O card 30. The PAD/NI card 46 also generates a "Rec_RDY" signal 170 and a "Replay_RDY" signal 172. These signals are used to enable and disable the exchange of data between a PAD/NI card 46 and a User Interface I/O card 30, and are part of the controls to synchronize multiple I/O PAD/NI sets. The "Real Time Counter Start/Stop" control signal 106 is connected to the TCC card 54 through the internal shared bus 56 of the R-T DAN module 28.

To synchronize a recording process, a "Real Time Counter Stop" control signal 106 is issued by the OAM controller 58 through the TCC card 54 to all PAD/NI cards 46 to be synchronized. The OAM controller 58 resets the Real Time Counter 136 on each PAD/NI card 46 to the same time value and then simultaneously, via the TCC card 54, releases the Real Time Counters 136 on all PAD/NI cards 46 to run using the "Real Time Counter Start" control signal 106. The OAM 58 issues a record command to each PAD/NI card 46 that identifies the storage device(s) 24 to use. Each PAD/NI card 46 attaches the storage device 24 and reads directory and file information as described below in connection with FIG. 14 to determine the location to record the data that it is about to receive. Each PAD/NI card 46 seeks to the selected position on its attached storage device 24, flushes buffers, and prepares to record. When each PAD/NI card 46 is in the record ready state, it enables the 'REC_RDY' signal 170. When the OAM controller 58 detects the record ready condition of all PAD/NI cards 46, it issues a "Record Ready" command to the TCC card 54 followed by a "Record Run" command. The TCC 54 synchronously issues the "Record Run" control signal 108 to all PAD/NI cards 46 and they begin to fill the data FIFO's 130 and 132 and time stamp FIFO's 140 and 142. The start time between all PAD/NI cards 46 is synchronous to within better than 5 nanoseconds. When a preset data level has filled the data FIFO's 130 and 132, the PCI Bus Controller 160 detects the set level and begins to record data and embedded time stamps to the network(s) 20 through the Fibre Channel Controllers 162. The format of how time stamps are embedded with data is described in connection with FIG. 14 described in detail below. Since recording on every PAD/NI card 46 was started synchronously by the TCC card 54, the data being written by every PAD/NI card 46 has simultaneously matching embedded time stamps with 10 nanosecond granularity. The very first byte of data written by each PAD/NI card 46 on its assigned storage device 24 was input to the PAD/NI card 46 from the User Interface I/O card 30 at exactly the same time.

To synchronize a replay process, the OAM controller 58 requests each PAD/NI card 46 to access the appropriate storage device 24 and seek to the requested replay data and begin a read operation. The R-T DAN module 28 can be implemented using a wide variety of embodiments to define the requested seek location. In one embodiment, the OAM controller 58 identifies this position to each PAD/NI card 46 as a Date Time Group time stamp (DTG). Each PAD/NI card 46 attaches the identified storage device 24 and reads directory and file information to determine the location on the storage device 24 of the DTG time stamp where the requested data is stored. The same DTG time stamp is requested of every PAD/NI card 46. Each PAD/NI card 46 seeks to the selected position on attached storage, flushes buffers, and prepares to receive data from the storage device 24. Each PAD/NI card 46 issues a status report to the OAM controller 58 to signal that it is in position. When all PAD/NI cards 46 have responded and are ready, the OAM controller 58 issues a read command to each of the PAD/NI cards 46. Data is transferred by each PAD/NI card 46 from storage to fill the Replay data FIFO's 173 and 174 which include both data and time stamp data within each Replay data FIFO 173 and 174. When each PAD/NI card 46 detects that the Replay data FIFO's 173 and 174 are filled, it is in the replay ready state and enables the "Replay_RDY" signal 172. When the OAM controller 58 detects the replay ready condition of all PAD/NI cards 46, it issues a "Replay Ready" command to the TCC card 54 followed by a "Replay Run" command. The TCC card 54 synchronously issues the "Replay Run" control signal 110 to all PAD/NI cards 46 and they begin to playback data and other signals such as IRIG In and AUX/Voice In. The replay run start time between all PAD/NI cards 46 is synchronous to within better than 5 nanoseconds. Data is clocked from data FIFO's 173 and 174 synchronously to this precision by the EXT Replay Clock In 168 from the User Interface I/O card 30. Time stamps are extracted by a Time Stamp Extractor 175, and data is transferred through the LVDS serializer 48 appropriately packed by the Word Packing Alignment circuit 128. The first data byte clocked from every PAD/NI card 46 is synchronous to better than 5 nanoseconds. As data is clocked from the PAD/NI card 46, requests are made by the PCI Bus Controller 160 to the Fiber Channel Controllers 162 to read data from the storage device 24 and keep the FIFO's 173 and 174 filled.

The PAD/NI card 46 includes an AUX/Voice input/output 176 which is connected to the DSP 144 through a two channel audio CODEC 177. The CODEC 177 also receives precision IRIG timecodes from the IRIG time interface 138. During playback of AUX/voice data, the CODEC 177 applies the AUX/voice data to the AUX/Voice input/output 176 and an IRIG timecode to an IRIG Replay interface 178.

Analog Interface Input/Output ("I/O") Card

Figure 5:
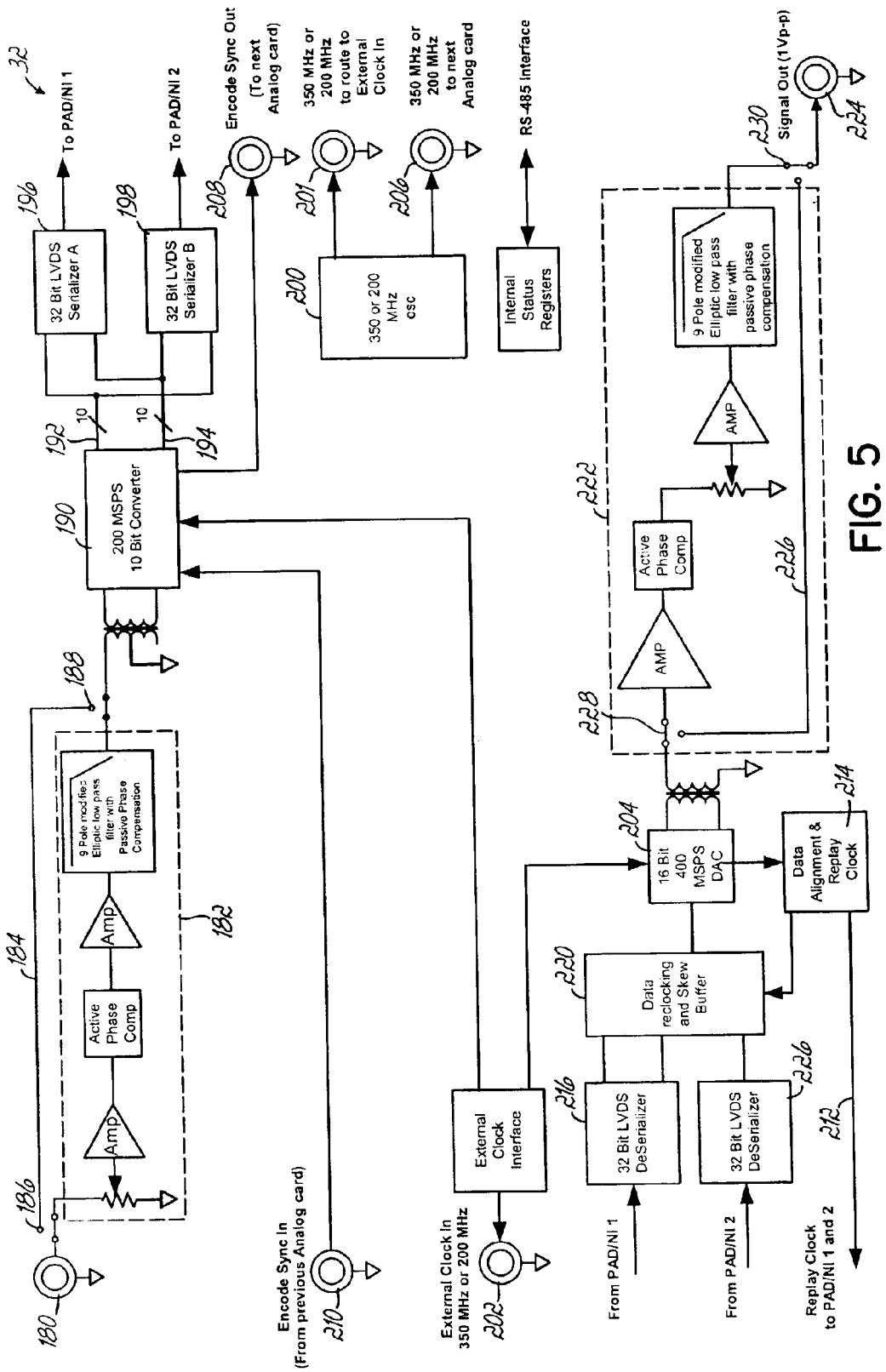
FIG. 5 is a schematic block diagram of an exemplary Analog Interface Input/Output ("I/O") card in accordance with the principles of the present invention.

Referring now to FIG. 5, an exemplary Analog Interface I/O card 32 is shown in detail. The Analog Interface I/O card 32 includes an analog input 180, such as a 70 MHz analog input, which is applied to an anti-aliasing circuit 182 for conditioning and filtering of the analog signal. A bypass 184 is provided through switches 186 and 188 to selectively bypass the anti-aliasing circuit 182 if desired by the user. The analog signal received at analog input 180 is applied to a 200 MSPS, 10 bit A/D converter 190 which produces the digitized digital data on two (2) 10 bit busses 192 and 194, designated the "A" and "B" busses, respectively. In one embodiment, the data of the "A" bus 192 is applied to an LVDS serializer 196 which communicates with a PAD/NI card 46. The data of the "B" bus 194 is applied to a second LVDS serializer 198 which communicates with a second PAD/NI card 46. Alternatively, the "A" and "B" busses 192, 194 are each applied to one or both of the LVDS serializers 196 and 198 and to one or both of the PAD/NI cards 46.

A 350 MHz or 200 MHz crystal oscillator 200 is provided on the Analog Interface I/O card 32 and is used through External Clock output 201 as the External Clock In input 202 which is applied to the A/D 190 and the D/A 204. The crystal oscillator 200 also provides an External Clock Out output 206 which is applied to a second Analog Interface I/O card 32 to provide accurate synchronization of the Analog Interface I/O cards 32. The Analog Interface I/O card 32 is free-running and distributes data to the PAD/NI card(s) 46 through the LVDS serial interfaces 196 and 198. An Encode Sync Out output 208 is applied to a second Analog Interface I/O card 32 so that the Analog Interface I/O cards 32 are in phase with respect to the "A" bus 196 and "B" bus 198 samples. The Analog Interface I/O card 32 has an Encode Sync In input 210 for receiving the Encode Sync Output from a previous Analog Interface I/O card 32. The PAD/NI card 46 either stores or discards the incoming analog data under the control of the OAM controller 58. The OAM controller 58 selects the width of the data word to be stored by the PAD/NI card 46.

During replay of the analog data, the 16 bit 400 MSPS DAC 204 applies a "Replay Clock Out" signal 212 to the PAD/NI cards 46 (i.e., as EXT Replay Clock In input 168) through a data alignment and replay clock 214 during each sample to ensure that data is provided to the DAC 204 at the appropriate time from the LVDS serial interfaces 48 of the PAD/NI cards 46 and the LVDS serial interfaces 216 and 218 of the Analog Interface I/O card 32. The data from the PAD/NI cards 46 is applied to a data reclocking and skew buffer 220 which also receives the replay clock signal from the data alignment and replay clock 214. In this way, as data is being clocked out of PAD/NI cards 46 through the replay clock signal 212, the data reclocking and skew buffer 220 is applying data to the DAC 204. The analog data from the DAC 204 is applied to a phase compensation and smoothing filter circuit 222 and then to the Analog Signal Out output 224. A bypass 226 is provided through switches 228 and 230 to selectively bypass the phase compensation and smoothing filter circuit 222 if desired by the user.

Digital Serial Interface Input/Output ("I/O") Card

Figure 6:
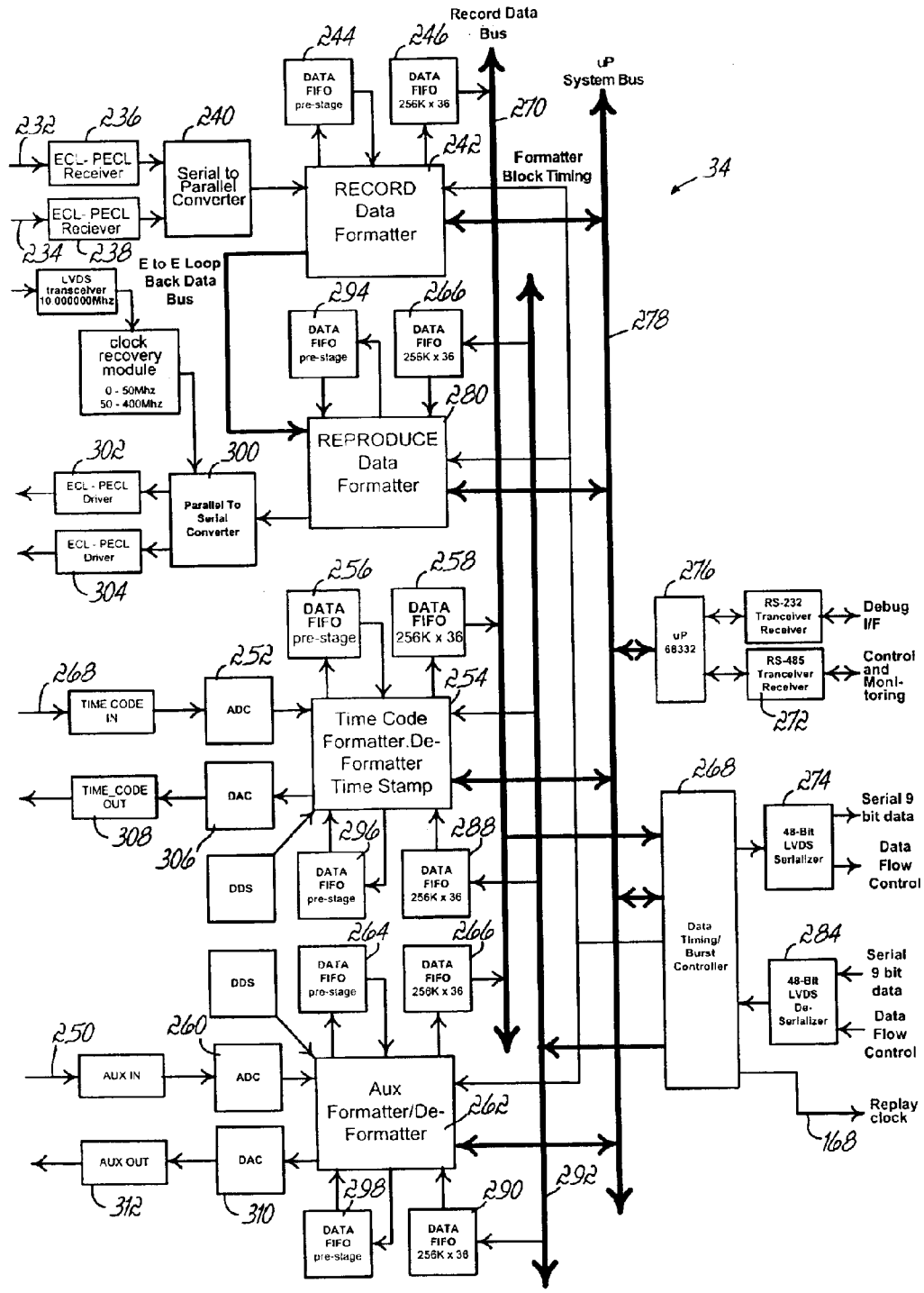
FIG. 6 is a schematic block diagram of an exemplary Digital Serial Interface Input/Output ("I/O") card in accordance with the principles of the present invention.

Referring now to FIG. 6, the architecture of the Digital Serial Interface I/O card 34 is shown in detail. The Digital Serial Interface I/O card 34 includes a serial input 232 and a clock input 234. The incoming serial data from the serial channel 232 and clock 234 are received through respective ECL-PECL receivers 236 and 238, and then applied to a serial-to-parallel converter 240. The clock rate of the incoming serial data is measured to determine the serial rate of the data and is stored with the data to be used during playback to set the playback data rate. The parallel data is applied to a record data formatter 242 which stores the data in a pre-stage data FIFO 244. The record data formatter 242 extracts data from the pre-stage data FIFO 244 and adds header information to the data, including the data rate and how many bits of that data is valid versus fill. The data and header information are then stored in a data FIFO 246.

At the same time that the serial data is received, time code data is received at a Time Code In input 248 from the timecode channel and AUX data is received at an AUX IN input 250 from the AUX channel. The time code information is applied to an A/D converter 252 and then applied to a time code formatter/deformatter and time stamp circuit 254. The time code information is stored in a pre-stage data FIFO 256 and then restored in a data FIFO 258 with appropriate header information. The AUX data is applied to an A/D converter 260 and then applied to an AUX formatter/deformatter 262. The AUX data is stored in a pre-stage data FIFO 264 and then restored in a data FIFO 266 with appropriate header information.

Each of the data FIFO's 246, 258 and 266 is connected to a data timing/burst controller 268 through a record data bus 270. The data timing/burst controller 268 extracts serial data, timecode data and AUX data from the respective data FIFO's 246, 258 and 266 and formats that data into packets under the control of the OAM controller 58 through the RS-485 transceiver/receiver 272. The synchronized serial data, timecode data and AUX data are applied to the LVDS serial interface of the PAD/NI card 46 during a record session through an LVDS serial interface 274 of the Digital Serial Interface I/O card 34. A microprocessor 276 is connected to the data timing/burst controller 268 through a microprocessor systems bus 278 and is responsible for setting up the hardware through hardware registers. To initialize, control and monitor the data flow events, the microprocessor 276 is also connected to each of the record data formatter 242, reproduce data formatter 280, time code formatter/deformatter and time stamp circuit 254 and AUX formatter/deformatter 262 through the microprocessor systems bus 278. The OAM controller 58 is able to monitor the Digital Serial Interface I/O card 34 through the RS-485 link 272 coupled to the microprocessor 276.

During a replay session, the PAD/NI 46 applies data to the Digital Serial Interface I/O card 34 through its LVDS serial interface 284. The "EXT Replay Clock In" input 168 is used by the PAD/NI card 46 to clock the serial data back to the Digital Interface I/O Serial card 34. The data is applied to the data timing/burst controller 268 and then to data FIFO's 286, 288, and 290 connected to the reproduce data formatter 280, the time code formatter/deformatter and time stamp 254 and AUX formatter/deformatter 262, respectively. The data timing/burst controller 268 is connected to the data FIFO's 286, 288 and 290 through a reproduce data bus 292.

The serial data, timecode data and AUX data are each deformatted and the header information is removed before the data is stored in respective pre-stage data FIFO's 294, 296 and 298. The deformatted serial data is applied to a parallel to serial converter 300 and serial and clock data are amplified through ECL-PECL receivers 302 and 304 for replay. Simultaneously, the deformatted timecode data is applied to digital to analog converter 306 and applied to the Timecode Out output 308. Similarly, the deformatted AUX data is applied to digital to analog converter 310 and applied to the AUX Out output 312.

Digital Parallel Interface Input/Output ("I/O") Card

Figure 7:
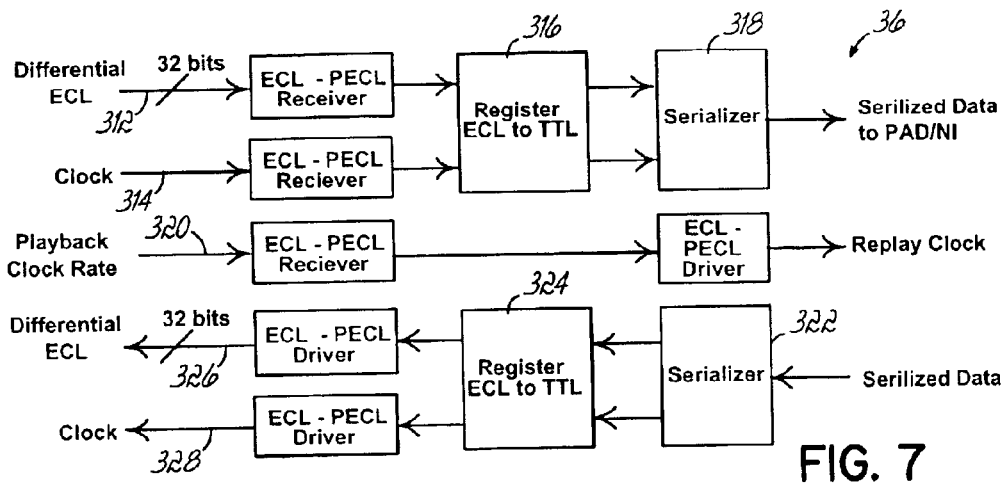
FIG. 7 is a schematic block diagram of an exemplary Digital Parallel Interface Input/Output ("I/O") card in accordance with the principles of the present invention.

Referring now to FIG. 7, the architecture of the Digital Parallel Interface I/O card 36 is shown in detail. The Digital Parallel Interface I/O card 36 includes a 32 bit wide parallel input 312 and a clock input 314. The clock input 314 clocks in the 32 bit wide word of parallel data to a register 316. The parallel data and clock data from the register 316 are applied to the LVDS serial interface 318 of the Digital Parallel Interface I/O card 36. The LVDS serial interface 318 serializes the data and applies serial data to the LVDS serial interface 48 of the PAD/Ni card 46. The PAD/NI card 46 accepts the serial data from the serializer 48. Data is formatted by the PAD/NI card 46 Word Size Packing Alignment circuit 128.

During a replay session, the Digital Parallel Interface I/O card 36 applies a Playback clock 320 as an external clock input to the "EXT Replay Clock In" input 168 of the PAD/NI card 46. In one embodiment of the Digital Parallel Interface I/O card 36 and PAD/NI card 46, this playback clock has a minimum acceptable frequency of 12 MHz. The PAD/NI card 46 applies serial data to the LVDS serial interface 322 of the Digital Parallel Interface I/O card 36 which converts the serial data into parallel data. The parallel data is applied to a register from which it is applied as a 32 bit wide parallel output 326 and clock output 328 of the Digital Parallel Interface I/O card 36 during replay.

Real-Time Data Acquisition And Storage Network

Figure 14:
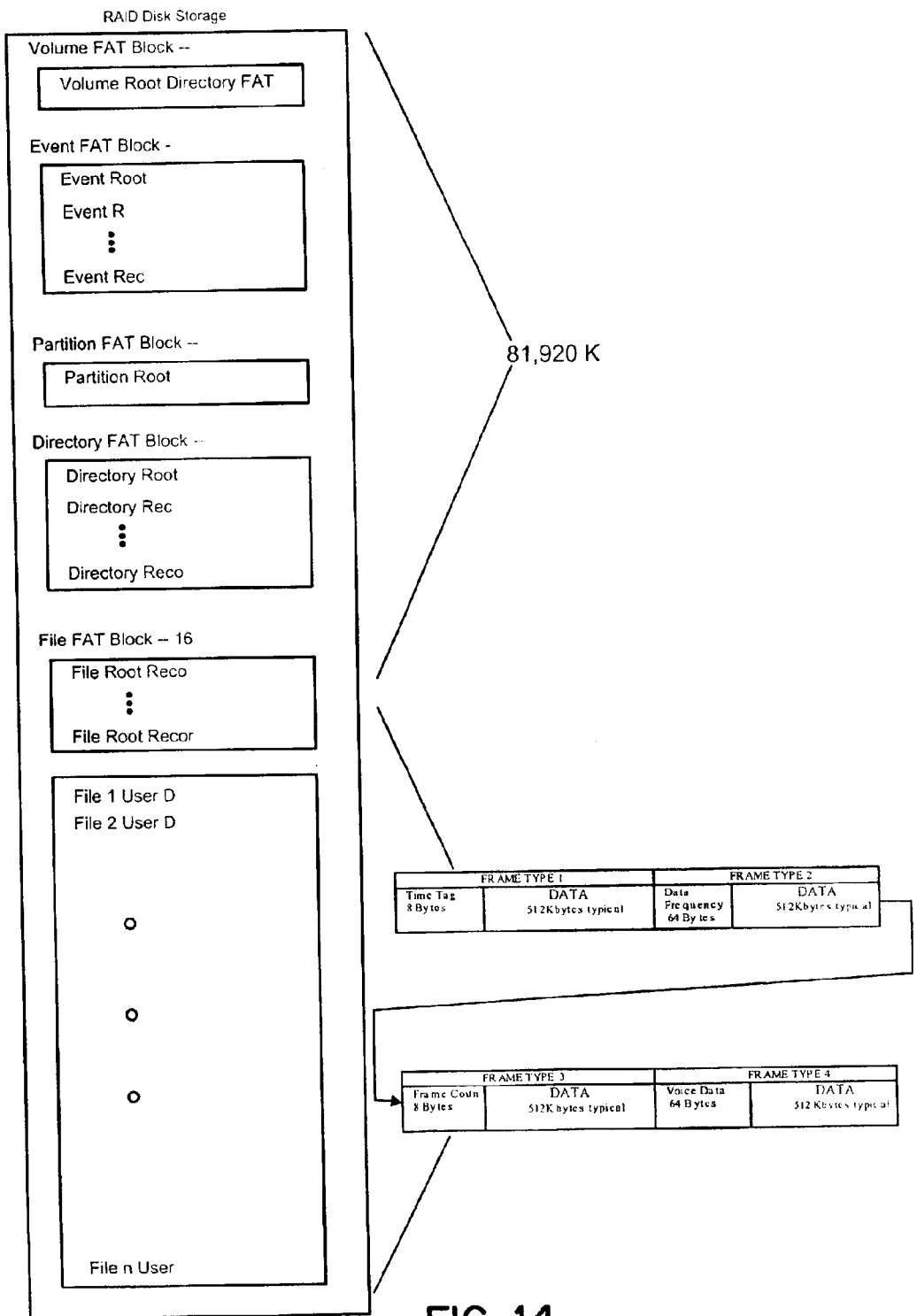
FIG. 14 is a schematic representation of an exemplary file structure for storage of data in a file-based multiplexed real-time data acquisition and storage network according to the principles of the present invention.

The real-time data acquisition and storage network 20 of the present invention is capable of both file-based real-time multiplexing by space-time division multiplexing as well as network-based real-time multiplexing by space-time division multiplexing. In a file-based solution, each PAD/NI card 46 serves as its own network controller. Each PAD/NI card 46 controls the storage device 24 associated with its own file(s) storage/retrieval by issuing commands and data to, and retrieving data from, files on the storage device 24 through the network 20. In networks 20 having multiple PAD/NI cards 46, each PAD/NI card 46 issues SCSI commands and data through the network 20 to the destination storage device 24 for the file(s) of the PAD/NI card 46. Once provisioned as to file name and destination storage device 24, each PAD/NI card 46 controls its own storage resources and file locations on the storage device in parallel with other PAD/NI cards 46 on the network 20. The PAD/NI card 46 packetizes data directly into packets suitable for fibre channel (FC) frames. In one embodiment of the present invention, this is SCSI-3 protocol which is a commonly available RAID Fibre Channel network interface. Time tagging, clock regeneration, and any other I/O and application specific information is placed directly into the framing protocol including file open, seek, write and read commands. FIG. 14 illustrates an exemplary file structure for storage of data in a file-based multiplexed real-time data acquisition and storage network 20.

In one embodiment of the file structure, data is stored on RAID devices in files as described by FIG. 14. FIG. 14 is a logical map to the data stored on the RAID. "File 1 User D", "File 2 User D" and through "File n User" represent the File locations where data is stored. Each data file is made up of a sequence of Data Frames, "Frame Type 1", "Frame Type 2", "Frame Type 3" and "Frame Type 4" as shown on FIG. 14. Each Frame includes two fields, a Data Information Field, and a Data Field. The PAD/NI card 46 writes an 8byte Time Tag Word into the Data Information Field in "Frame 1" which it reads from the time stamp FIFO 140. This represents the precise time with nanosecond level precision that the I/O User Interface card 30 recorded the first byte of data stored in the data FIFO 130. The PAD/NI card 46 then writes each data byte to the Data Field of Frame Type 1 that it reads from the data FIFO 130. The length of bytes of Frame Types 1–4 is a fixed number. When Frame Type 1 is filled, the other three Frame Types are filled with the indicated information and data. The Information Field of Frame Type 2 is 64 bytes and is inserted by the PAD/NI card 46 to indicate the recorded data rate of the data recorded on I/O User Interface card 30. Frame Type 3 Information is a Frame Count number inserted by the PAD/NI card 46 DSP 144 through the dual port RAM 146, and the Frame Type 4 Information Field contains the Voice Data recorded at the Voice Input and Output 146 of the PAD/NI card 46. The Voice Data is recorded into the Frame Field by the DSP 144 through the dual port RAM 146.

The data stored on the RAID is contained in a logical Volume of Files. The OAM 58 instructs the PAD/NI card 46 to "mount" or connect to a storage device 24. The PAD/NI card 46 "reads" the Volume File Access Table (FAT) Block shown in FIG. 14. The Volume FAT is the key the PAD/NI card 46 uses to determine where files are located and where to write files that will be stored. The Volume FAT Block includes a Volume Root Director FAT Block, an Event FAT Block, a Partition FAT Block, a Directory FAT Block, and a File FAT Block used to define the logical hierarchy of files and file locations.

Figure 8:
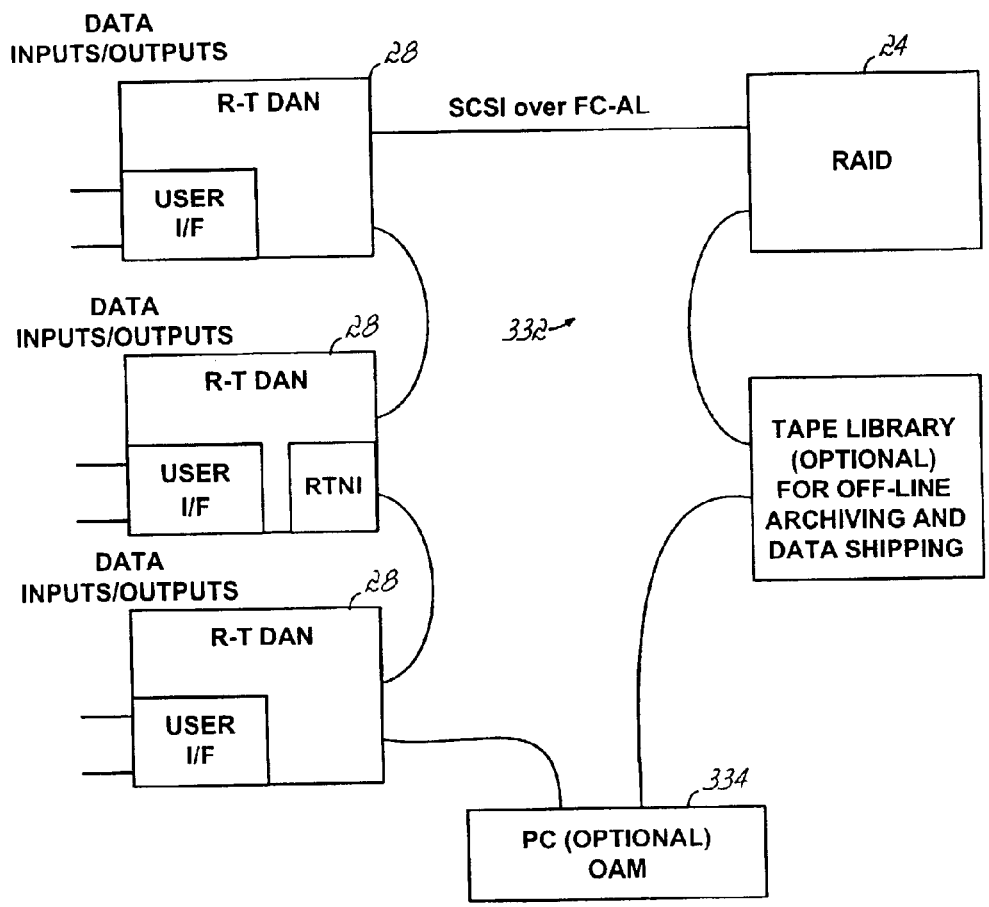
FIG. 8 is a schematic block diagram of an exemplary real-time data acquisition and storage network according to a first embodiment of the present invention, illustrating multiple R-T DAN modules and storage devices connected to an arbitrated loop network.

Referring to FIG. 8, a file-based network solution according to one embodiment of the present invention is shown including three (3) R-T DAN modules 28 to record and playback multiple data signals interfaced to a single storage device 24, such as a RAID, using a fiber channel arbitrated loop network 332 connecting multiple PAD/NI cards 46. Each of the PAD/NI cards 46 of the R-T DAN modules 28 are provisioned or configured from either the front panel of the R-T DAN module 28 or from an OAM workstation 334 to issue commands and data to, and retrieve data from, the RAID 24 for an aggregate data throughput limited only by the network and RAID device. The data of each I/O User Interface card 30 is packetized with a measurement of the data frequency and timecode the packet is generated and written to a separate file according to the file structure of FIG. 14.

Figure 9:
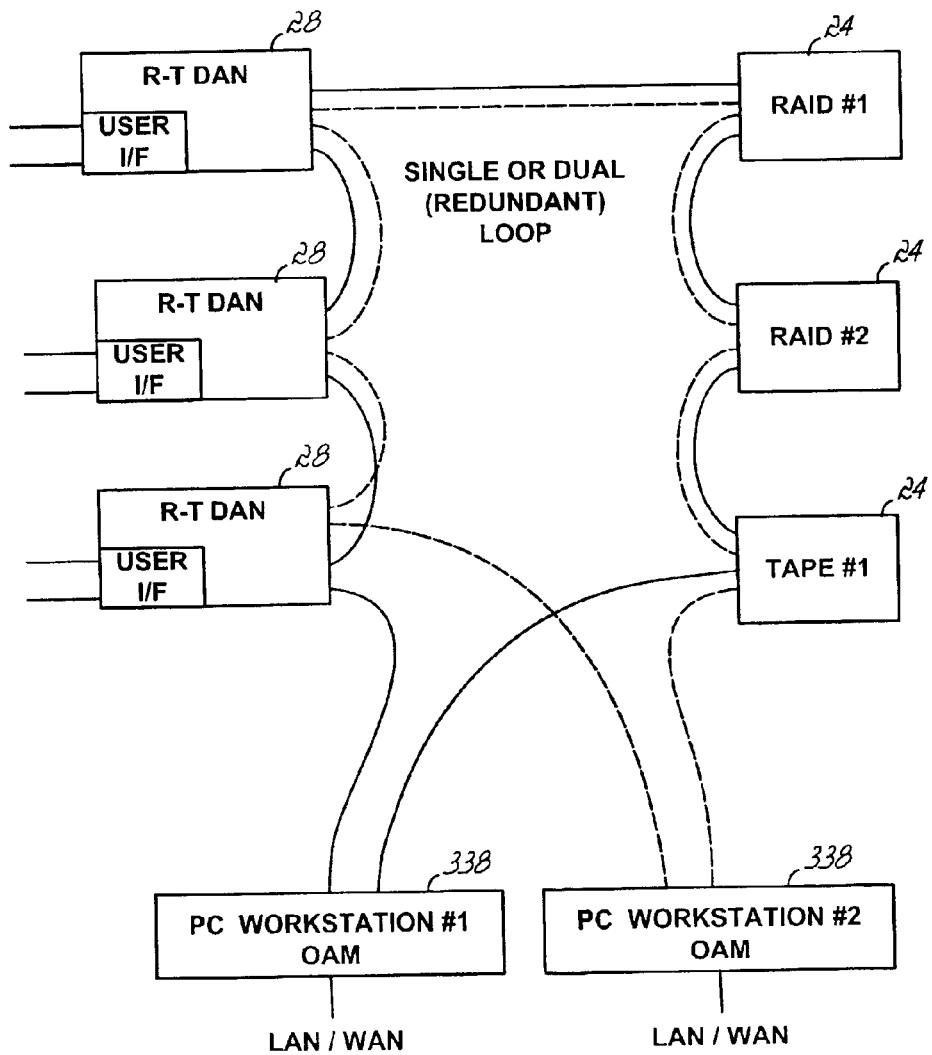
FIG. 9 is a schematic block diagram of an exemplary real-time data acquisition and storage network according to a second embodiment of the present invention, illustrating multiple R-T DAN modules and storage devices connected to a single or dual (redundant) arbitrated loop network.

FIG. 9 illustrates a file-based solution according to another embodiment of the present invention. In this embodiment, three (3) separate R-T DAN modules 28 at different locations are interfaced to three (3) separate storage devices 24 at different locations using a fully redundant dual arbitrated loop network 336. A pair of remote OAM workstations 338 are connected to the network 336 to provide system-wide provisioning, OAM and control. Each of the R-T DAN modules 28 is provisioned or configured as described in detail above to issue commands and data to, and retrieve data from, the destination storage devices 24 for an aggregate data throughput limited only by the network 20 and storage devices 24.

Figure 10:
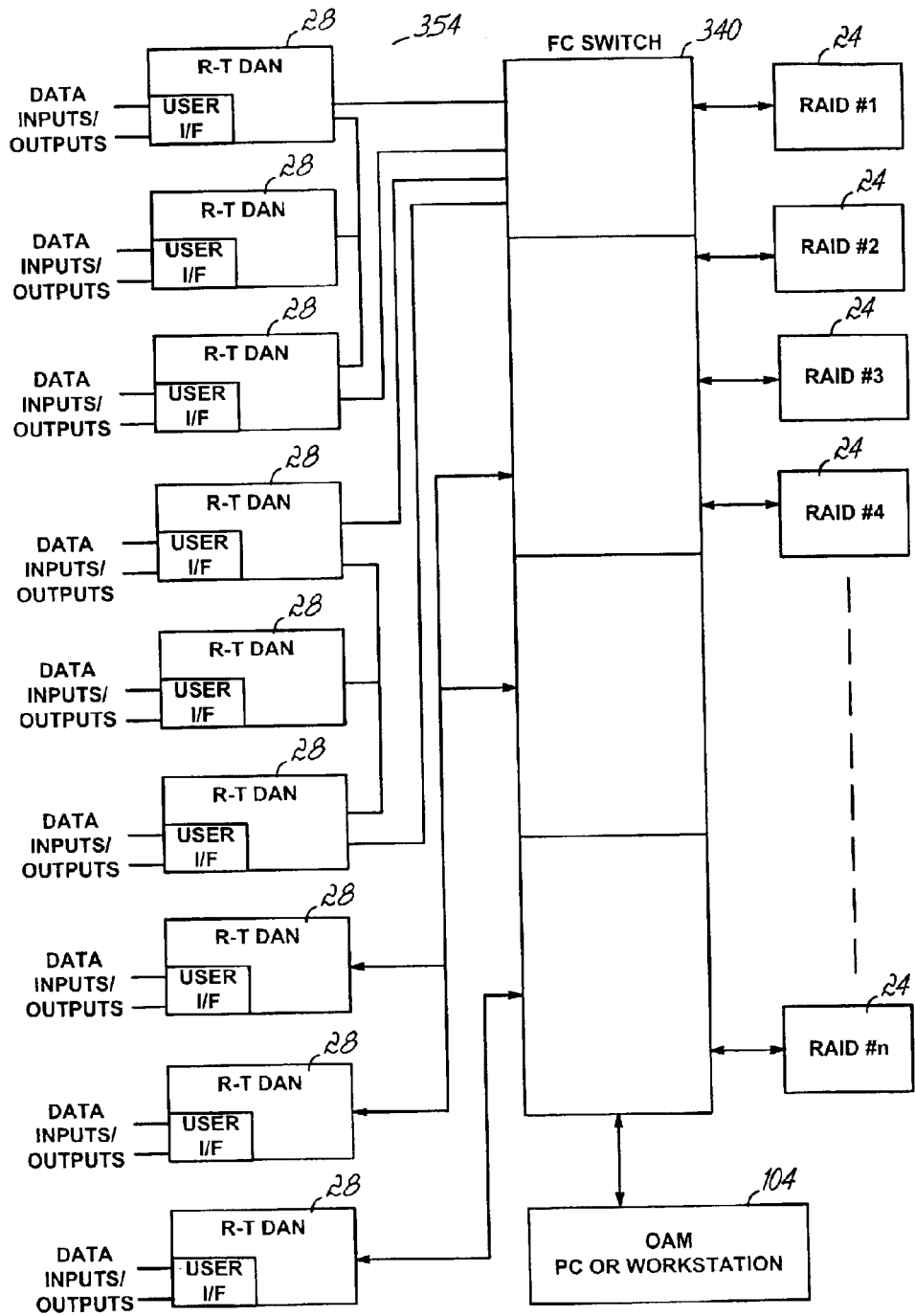
FIG. 10 is a schematic block diagram of an exemplary real-time data acquisition and storage network according to a third embodiment of the present invention, illustrating multiple R-T DAN modules and storage devices connected to a fibre channel switched network.

As shown in FIG. 10, for even higher scale integration and performance, or for systems with data sources and storage devices that are not co-located, switch fabrics can be employed, alone or in combination with arbitrated loops. FIG. 10 illustrates multiple R-T DAN modules 28 and storage devices 24 connected to a switched fabric 340 through multiple arbitrated loops and point-to-point links.

In an ATM-cell space-time division multiplexing solution, the PAD/NI card 46 packetizes the data directly into ATM cells for transmission over fibre channel (FC) frames. Multiplexed data is stored as a single stream of ATM cells in a single logical file on the storage device 24 rather than across multiple logical files.

Figure 11:
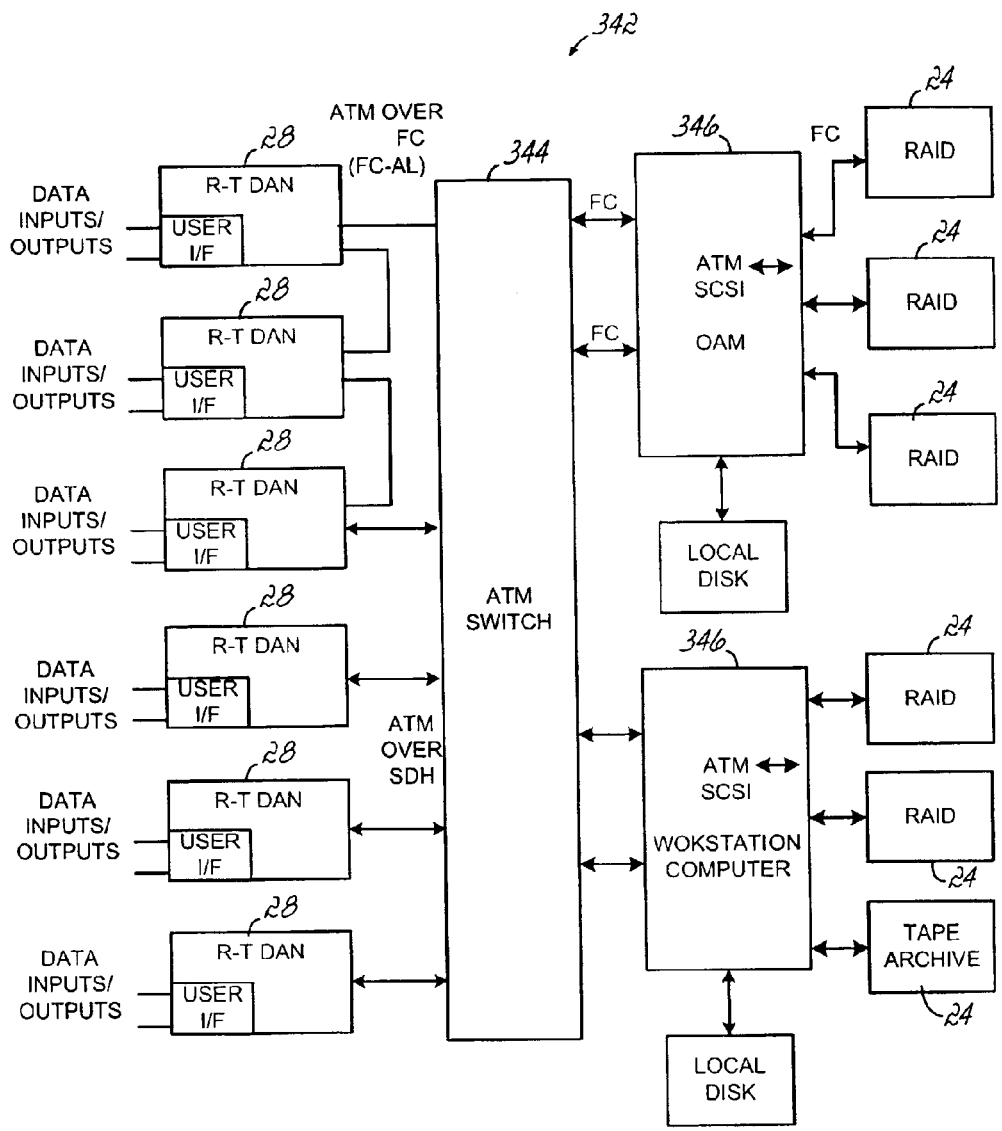
FIG. 11 is a schematic block diagram of an exemplary real-time data acquisition and storage network according to a fourth embodiment of the present invention, illustrating multiple R-T DAN modules and storage devices connected to an ATM over fibre channel switched network.

FIG. 11 illustrates an ATM-cell configuration of a real-time data acquisition and storage network 342 in accordance with an alternative embodiment of the present invention. The PAD/NI cards 46 of the RT-DAN modules 28 output ATM cells in either ATM over FC (AAL5) or ATM over SONET/SDH line interfaces. The ATM switch 344 itself implements the space-time division multiplexing/demultiplexing function, routing the ATM to the appropriate storage device 24. Following the ATM switch 344, the ATM cell stream is applied to one or more processors 346 which serve to perform the "ATM-to-SCSI adaptation" to package the ATM data in an appropriate SCSI format for the storage devices 24. The ATM switch 344 performs multiplexing/demultiplexing functions at the ATM cell level whereas the SCSI processor terminates the ATM communications and repackages the stream of ATM cell data along with the necessary channel identification and SCSI commands for storage of the data on the storage devices 24.

Figure 12:
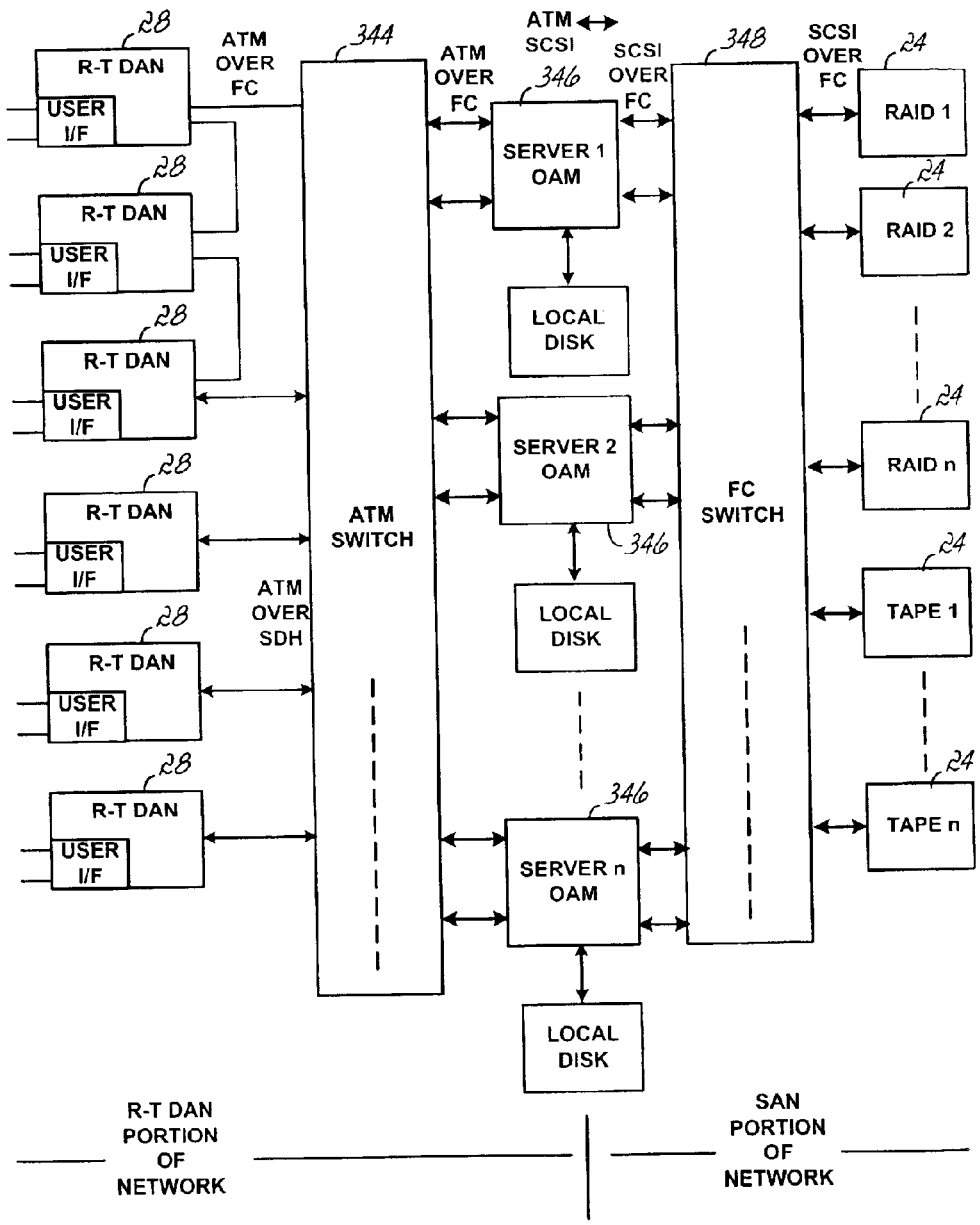
FIG. 12 is a schematic block diagram of an exemplary real-time data acquisition and storage network according to a fifth embodiment of the present invention, illustrating multiple R-T DAN modules and storage devices connected to an ATM over fibre channel switched network and a SCSI over fibre channel switched network.

The network architecture of FIG. 12 is similar to that of FIG. 11, where like numerals represent like parts, however a fibre channel (FC) switch 348 has been added to interconnect the storage devices 24 to the SCSI processors 346.

Figure 13:
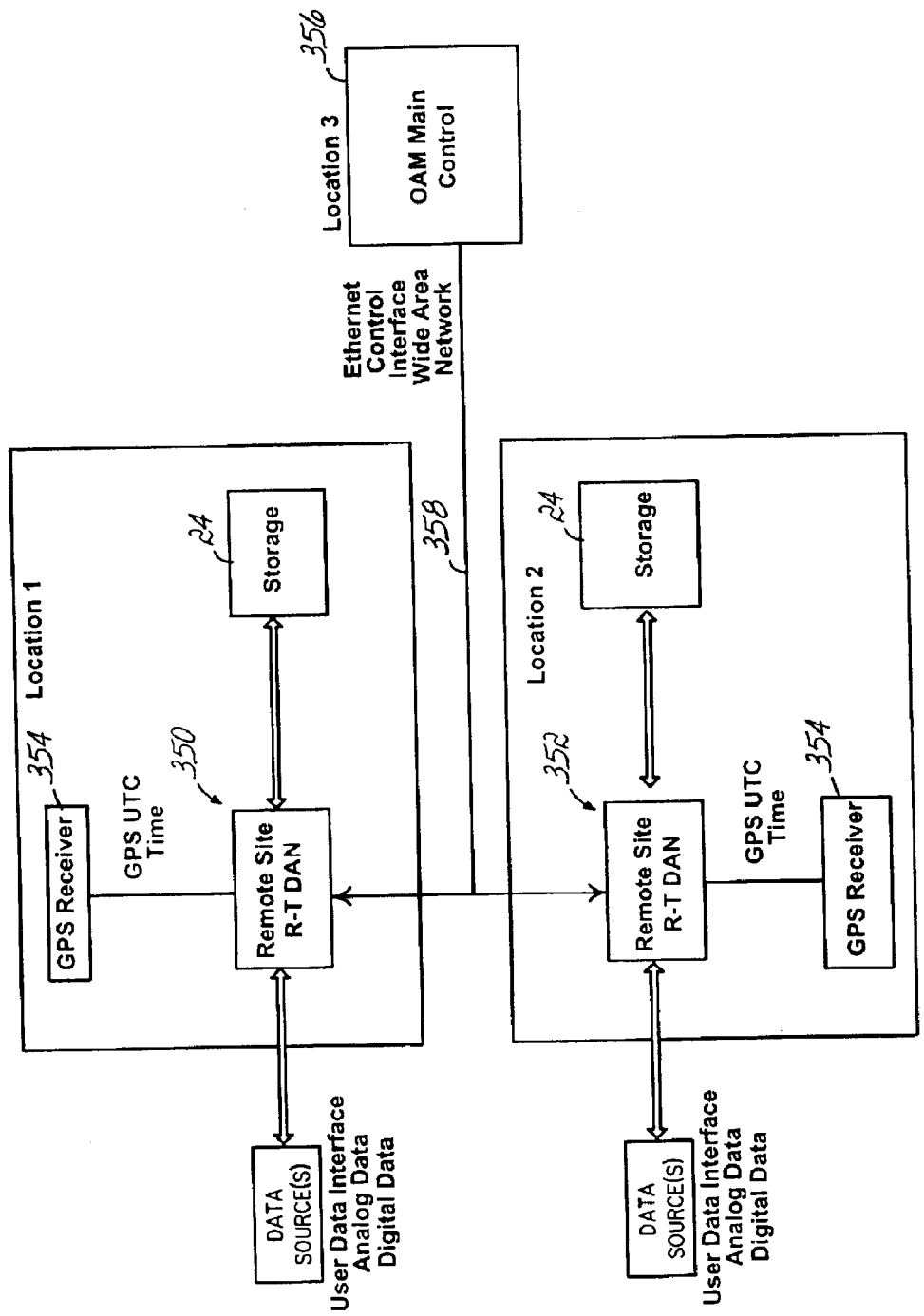
FIG. 13 is a schematic block diagram of two (2) exemplary real-time data acquisition and storage networks located in separate geographic locations.

Synchronization of Remote Real-Time Data Acquisition Network ("R-T DAN") Modules Referring now to FIG. 13, synchronization of remote R-T DAN modules 350 and 352 will be described. Unlike the previous embodiments wherein the multiple R-T DAN modules 46 have been connected to a common network, the R-T DAN modules 350 and 352 of this embodiment are geographically spaced apart and there is no means for sharing timing signals to the R-T DAN modules 350 and 352 through a common network. In this embodiment, each R-T DAN module 350 and 352 include a GPS receiver 354 for receiving precision GPS timecode information. The GPS timecode information is applied as an external time of day (TOD) reference signal to each of the remote R-T DAN modules 350 and 352. A remote OAM main control 356 is coupled to each of the R-T DAN modules 350 and 352 through an Ethernet Control Interface Wide Area Network 358 to configure, provision, monitor and control the R-T DAN modules 350 and 352 as described in detail above. Each R-T DAN module 350 and 352 is programmed with a record time, and each R-T DAN module 350 and 352 resets its internal counters and synchronizes through its 10 MHz reference clock to the GPS timecode information received from the GPS receivers 354. At the record time programmed by the OAM Main control 356, the remote R-T DAN modules 350 and 352 will simultaneously begin recording and will be synchronized to each other. A synchronization of I/O signals through recording, storing and playback with a precision better than 25 nanoseconds can be achieved using the methods described.

The real-time data acquisition and storage network 20 of the present invention provides significant advantages over known time division multiplexors (TDM's) used in data acquisition systems. The powerful and flexible real-time data acquisition and storage network 20 of the present is capable of scaling over a wide range of individual and aggregate bandwidths, number of input channels, and total storage capacity, while preserving precise reconstruction, accurate channel-to-channel time coherency, and ease of configuration, monitoring and control.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. For example, while the I/O User Interface cards 30 are shown and described in one embodiment as being capable of performing both data acquisition and data reconstruction, it is contemplated that the data acquisition and data reconstruction functions may be separated into two different cards, with one card being capable of data acquisition only and the other card being capable of data reconstruction only. Moreover, while the PAD/NI card 46 has been described as functioning with a single I/O User interface card 30 through the LVDS serial interface, it is contemplated that multiple I/O User Interface cards 30 may communicate with a single PAD/NI card 46 through a standard multi-drop signal connection interface. Accordingly, departures may be made from such details without departing from the spirit or scope of applicant's general inventive concept.

Having described the invention, what is claimed is:

1. A method of storing a generally continuous stream of data and time code information acquired by a data acquisition device from a data source and a time code source coupled to the data acquisition device, comprising the steps of:
   connecting at least one storage device to a network;
   connecting the data acquisition device to the network;
   acquiring a generally continuous stream of data at the data acquisition device from the data source;
   acquiring time code information at the data aquisition device from the time code source;
   correlating the acquired data with the acquired time code information at the data acquisition device; and
   storing the correlated data and time code information acquired by the data acquisition device in real-time through the network on the at least one storage device.

2. The method of claim 1, further comprising the steps of:
   connecting a plurality of storage devices to the network;
   storing the correlated data and time code information on the plurality of storage devices.

3. The method of claim 1, further comprising the steps of:
   packetizing the correlated data and time code information into a plurality of data packets; and
   storing the data packets on the at least one storage device.

4. The method of claim 2, further comprising the steps of:
   packetizing the correlated data and time code information into a plurality of data packets; and
   storing the data packets on the plurality of storage devices.

5. The method of claim 1, further comprising the steps of:
   associating a storage device with the data acquisition device; and
   storing the correlated data and time code information on the storage device associated with the data acquisition device.

6. The method of claim 1, further comprising the step of:
   reconstructing the data and time code information acquired by the data acquisition device from the data and time code information stored on the at least one storage device.

7. The method of claim 2, further comprising the step of:
   reconstructing the data and time code information acquired by the data acquisition device from the data and time code information stored on the plurality of storage devices.

8. A method of storing a generally continuous stream of data and time code information acquired by a plurality of data acquisition devices on a plurality of storage devices, each of the plurality of data acquisition devices and plurality of storage devices being connected to a network, comprising the steps of:
   creating a plurality of data acquisition nodes on the network, each of the plurality of data acquisition nodes being associated with one of the plurality of data acquisition devices;
   creating a plurality of storage nodes on the network, each of the plurality of storage nodes being associated with one of the plurality of storage devices;
   acquiring a generally continuous stream of data at each data acquisition device from a data source coupled to the data acquisition device;

acquiring time code information at each data acquisition device from a time code source coupled to the data acquisition device; and storing the data and time code information acquired by a data acquisition device associated with at least one of the plurality of data acquisition nodes in real-time through the network on at least one of the plurality of storage devices associated with the plurality of storage nodes.

9. The method of claim 8, further comprising the steps of:

packetizing the acquired data and time code information at a data acquisition node into a plurality of data packets; and storing the plurality of data packets on at least one of the storage devices associated with the plurality of storage nodes.

10. The method of claim 9, further comprising the step of:

correlating the acquired data and time code information prior to storing the data packets on the plurality of storage devices.

11. The method of claim 8, further comprising the step of:

reconstructing the data and time code information acquired by the plurality of data acquisition instruments from the data and time code information stored on the plurality of storage devices.

12. A method of storing a generally continuous stream of data and time code information acquired by a plurality of data acquisition devices on a plurality of storage devices, each of the plurality of data acquisition devices and each of the plurality of storage devices being connected to a network, comprising the steps of:

creating a plurality of data acquisition nodes on the network;

associating one of the plurality of data acquisition devices to one of the data acquisition nodes on the network;

creating a plurality of storage nodes on the network;

connecting one of the storage devices to one of the storage nodes on the network;

acquiring a generally continuous stream of data at each data acquisition device from a data source coupled to the data acquisition device;

acquiring time code information at each data acquisition device from a time code source coupled to the data acquisition device; and storing the data and time code information acquired by the data acquisition devices associated with the plurality of data acquisition nodes in real-time through the network on the plurality of storage devices associated with the plurality of storage nodes.

13. The method of claim 12, further comprising the step of:

associating each of the plurality of data acquisition nodes with at least one of the plurality of storage nodes so that data and time code information acquired at one of the plurality of data acquisition nodes is stored at the storage node associated with that data acquisition node.

14. The method of claim 13, further comprising the steps of:

connecting a controller to the network; and using the controller to associate each of the plurality of data acquisition nodes with at least one of the plurality of storage nodes.

15. The method of claim 13, further comprising the steps of:

packetizing the acquired data and time code information at a data acquisition node into a plurality of data packets; and storing the plurality of data packets on at least one of the storage devices.

16. The method of claim 15, further comprising the step of:

correlating the acquired data and time code prior to storing the data packets on the plurality of storage devices.

17. The method of claim 12, further comprising the step of:

reconstructing the data and time code information acquired by the plurality of data acquisition devices from the data stored on the plurality of storage devices.

18. A method of storing a generally continuous stream of data and time code information acquired by a plurality of data acquisition devices on a plurality of storage devices and reconstructing the acquired data and time code information from the plurality of storage devices, comprising:

connecting the plurality of storage devices to a network;

connecting the plurality of data acquisition devices to the network;

acquiring a generally continuous stream of data at each data acquisition device from a data source coupled to the data acquisition device;

acquiring time code information at each data acquisition device from a time code source coupled to the data acquisition device; and correlating the acquired data with the acquired time code information at the data acquisition device;

storing the correlated data and time code information in real-time through the network, on the plurality of storage devices; and reconstructing the data and time code information acquired by the plurality of data acquisition devices from the correlated data and time code information stored on the plurality of storage devices.

19. The method of claim 18, further comprising the steps of:

packetizing the acquired data and time code information into a plurality of data packets; and storing the data packets on the plurality of storage devices.

20. A data acquisition network for storing a generally continuous stream of data and time code information acquired from at least one data source and at least one time code source on at least one storage device connected to a network, comprising:

a data acquisition device having at least one input channel adapted to be connected to the at least one data source and the at least one time code source for receiving a generelly continuous stream of data and time code information from the data source and the time code source and further having at least one output channel adapted to be connected to the network for storing the data and time code information acquired by the data acquisition device in real-time through the nework on the at least one storage device connected to the network.

21. The data acquisition network of claim 20, wherein the data acquisition device is operable to packetize the acquired data and time code information into a plurality of data packets prior to storing the data on the at least one storage device connected to the network.

22. The data acquisition network of claim 21, further comprising a plurality of storage devices connected to the network.

23. The data acquisition network of claim 22, wherein the data acquisition device is operable to store the data packets on the plurality of storage devices.

24. The data acquisition network of claim 20, wherein the data acquisition device is operable to reconstruct the acquired data and time code information from the data and time code information stored on the at least one storage device.

25. The data acquisition network of claim 21, wherein the data acquisition device is operable to reconstruct the acquired data and time code information from the data packets stored on the at least one storage device.

26. The data acquisition network of claim 23, wherein the data acquisition device is operable to reconstruct the acquired data and time code information from the data packets stored on the plurality of storage devices.

27. The data acquisition network of claim 20, wherein the data acquisition device is operable to control storage of data to and retrieval of data from the at least one of the storage devices.

28. A data acquisition network for storing a generally continuous stream of data and time code information acquired from at least one data source and at least one time code source, comprising:

a network;

a plurality of data acquisition nodes connected to the network, each of the data acquisition nodes being adapted to acquire a generally continuous stream of data and time code information from the at least one data source and the at least one time code source and distribute the data and time code information in real-time to the network; and a plurality of storage nodes connected to the network and operable to store in real-time the data and time code information distributed by the plurality of data acquisition nodes.

29. The data acquisition network of claim 28, wherein at least one of the data acquisition nodes is associated with at least one of the storage nodes.

30. The data acquisition network of claim 29, further comprising a controller connected to the network and operable to associate the at least one data acquisition node with the at least one storage node.

* * * * *